United States Patent
Veit et al.

(10) Patent No.: US 7,086,519 B2
(45) Date of Patent: Aug. 8, 2006

(54) POSITIVE DISPLACEMENT SHOE AND SLAT SORTER APPARATUS AND METHOD

(75) Inventors: Frank W Veit, Spring Lake, MI (US); David W Zeitler, Caledonia, MI (US); Rhonda J Verploegen, Sparta, MI (US); Andrew R Black, Fremont, MI (US); Charles W Bozarth, Comstock Park, MI (US); Clyde Miin-Arng Ko, Ada, MI (US)

(73) Assignee: Dematic Corp., Grand Rapids, MI (US)

( * ) Notice: Subject to any disclaimer, the term of this patent is extended or adjusted under 35 U.S.C. 154(b) by 0 days.

(21) Appl. No.: 11/081,040

(22) Filed: Mar. 15, 2005

(65) Prior Publication Data

US 2005/0167240 A1 Aug. 4, 2005

Related U.S. Application Data

(60) Continuation of application No. 10/780,408, filed on Feb. 17, 2004, now Pat. No. 6,866,136, which is a division of application No. 09/968,742, filed on Sep. 28, 2001, now Pat. No. 6,814,216.

(60) Provisional application No. 60/236,230, filed on Sep. 28, 2000, provisional application No. 60/278,892, filed on Mar. 26, 2001.

(51) Int. Cl.
*B65G 47/10* (2006.01)
*B65G 47/46* (2006.01)

(52) U.S. Cl. ............ 198/370.02; 198/370.13; 198/502.2; 198/890

(58) Field of Classification Search .......... 198/370.02, 198/370.07, 370.13, 619, 502.2, 890
See application file for complete search history.

(56) References Cited

U.S. PATENT DOCUMENTS

| 3,179,241 A | 4/1965 | Kain .................. 198/805 |
| 3,361,247 A | 1/1968 | Lauzon et al. .............. 198/38 |
| 3,426,887 A | 2/1969 | Ward et al. ................ 198/177 |
| 3,788,447 A | 1/1974 | Stephanoff .................. 198/41 |
| 3,807,314 A | 4/1974 | Slemmons .............. 104/148 R |
| 4,138,008 A | 2/1979 | Del Rosso ................ 198/365 |
| 4,526,271 A | 7/1985 | Finnighan ................ 198/648 |
| 4,675,582 A | 6/1987 | Hommes et al. ............. 318/38 |
| 4,711,341 A | 12/1987 | Yu et al. ................ 198/370.02 |
| 4,732,260 A | 3/1988 | Canziani .................... 198/365 |

(Continued)

FOREIGN PATENT DOCUMENTS

DE  2745298 C2  1/1987

(Continued)

OTHER PUBLICATIONS

Title: Conveyor System With Lateral Motion Capability (Inventor: A. Kimura), Oct. 1986, Japan.

*Primary Examiner*—Douglas Hess
(74) *Attorney, Agent, or Firm*—Van Dyke, Gardner, Linn & Burkhart, LLP

(57) ABSTRACT

A positive displacement sorter apparatus and method includes providing a plurality of slats being interconnected in an endless web, an upper run of the web defining a conveying surface, and a plurality of pusher shoes gliding along at least some of the slats to laterally displace articles on the conveying surface. A linear motor system is provided to propel the web and includes a plurality of linear motor secondaries at the slats and at least one primary for propelling the secondaries. A control system controls the primaries.

24 Claims, 25 Drawing Sheets

U.S. PATENT DOCUMENTS

| | | | |
|---|---|---|---|
| 4,760,908 A | 8/1988 | Houghton | 198/365 |
| 4,770,291 A | 9/1988 | Shaw | 198/851 |
| 4,800,818 A | 1/1989 | Kawaguchi et al. | 104/290 |
| 4,932,515 A | 6/1990 | Stöhr | 198/822 |
| 4,973,892 A | 11/1990 | Murata et al. | 318/135 |
| 5,038,912 A | 8/1991 | Cotter | 198/370 |
| 5,088,593 A | 2/1992 | Lewin | 198/619 |
| 5,127,510 A | 7/1992 | Cotter et al. | 198/372 |
| 5,165,515 A | 11/1992 | Nitschke et al. | 198/349.95 |
| 5,167,315 A | 12/1992 | Doane | 198/370 |
| 5,172,803 A | 12/1992 | Lewin | 198/619 |
| 5,191,959 A | 3/1993 | Leemkuil | 198/372 |
| 5,199,548 A | 4/1993 | Tanaka et al. | 198/502.4 |
| 5,218,277 A | 6/1993 | Pattison et al. | 318/135 |
| 5,285,886 A | 2/1994 | Ostholt, Rudiger et al. | 198/370 |
| 5,295,568 A | 3/1994 | Saito et al. | 198/330 |
| 5,333,715 A | 8/1994 | Sapp | 198/372 |
| 5,402,021 A | 3/1995 | Johnson | 310/12 |
| 5,409,095 A | 4/1995 | Hoshi et al. | 198/372 |
| 5,427,223 A | 6/1995 | van den Goor | 198/365 |
| 5,435,429 A | 7/1995 | Van Den Goor | 198/890.1 |
| 5,588,520 A | 12/1996 | Affaticati et al. | 198/370.06 |
| 5,613,591 A | 3/1997 | Heit et al. | 198/370.02 |
| 5,657,858 A | 8/1997 | Van Den Goor | 198/890 |
| 5,722,532 A * | 3/1998 | Troisi et al. | 198/890 |
| 5,732,814 A | 3/1998 | Owczarzak et al. | 198/890 |
| 5,909,797 A | 6/1999 | Van Den Goor | 198/370.02 |
| 5,927,465 A * | 7/1999 | Shearer, Jr. | 198/370.02 |
| 5,927,466 A | 7/1999 | Rowley | 198/370.03 |
| 5,947,361 A | 9/1999 | Berger et al. | 226/92 |
| 5,967,289 A | 10/1999 | Kelsey | 198/370.02 |
| 5,975,277 A | 11/1999 | Skarlupka | 198/370.04 |
| 6,041,909 A | 3/2000 | Shearer, Jr. | 198/370.02 |
| 6,044,956 A * | 4/2000 | Henson et al. | 198/370.02 |
| 6,139,240 A | 10/2000 | Ando | 414/267 |
| 6,292,710 B1 | 9/2001 | Bonnet | 700/230 |
| 6,357,574 B1 | 3/2002 | Eberle et al. | 198/465.4 |
| 6,361,268 B1 | 3/2002 | Pelrine et al. | 414/749.2 |
| 6,459,061 B1 | 10/2002 | Kugle et al. | 209/583 |
| 6,478,144 B1 | 11/2002 | Sweazy | 198/890 |
| 6,513,642 B1 | 2/2003 | Shearer, Jr. et al. | 198/370.02 |
| 6,513,649 B1 | 2/2003 | Lauzon et al. | 198/832.1 |
| 6,528,908 B1 | 3/2003 | Lee | 310/12 |
| 6,615,972 B1 | 9/2003 | Veit et al. | 198/370.02 |
| 6,814,216 B1 | 11/2004 | Veit et al. | |
| 6,860,383 B1 * | 3/2005 | Veit et al. | 198/815 |
| 6,866,136 B1 | 3/2005 | Veit et al. | |
| 6,923,308 B1 * | 8/2005 | Veit | 198/370.02 |
| 2003/0079971 A1 | 5/2003 | Veit | |

FOREIGN PATENT DOCUMENTS

| | | |
|---|---|---|
| DE | 4342851 C2 | 9/1995 |
| DE | 19852926 A1 | 5/2000 |
| EP | 0212027 A1 | 3/1987 |
| EP | 0444734 B1 | 5/1994 |
| EP | 0602694 B1 | 3/1998 |
| EP | 0648694 B1 | 12/1998 |
| EP | 0792824 | 7/2000 |
| GB | 2057381 A | 4/1981 |
| GB | 2242409 A | 10/1991 |
| JP | 57-112223 | 7/1982 |
| JP | 2-86923 | 7/1990 |
| JP | 4-223921 | 8/1992 |
| JP | 07-61570 | 3/1995 |
| JP | 7-315561 | 12/1995 |
| JP | 7-323911 | 12/1995 |
| JP | 8-319021 | 12/1996 |
| JP | 9-52621 | 2/1997 |
| JP | 9-110149 | 4/1997 |
| JP | 9-183517 | 7/1997 |
| JP | 9-183518 | 7/1997 |
| JP | 9-290914 | 11/1997 |
| JP | 11-193128 | 7/1999 |
| JP | 0-103518 | 4/2000 |
| JP | 0-118699 | 4/2000 |
| WO | 00/48739 | 8/2000 |
| WO | 00/68125 | 11/2000 |

* cited by examiner

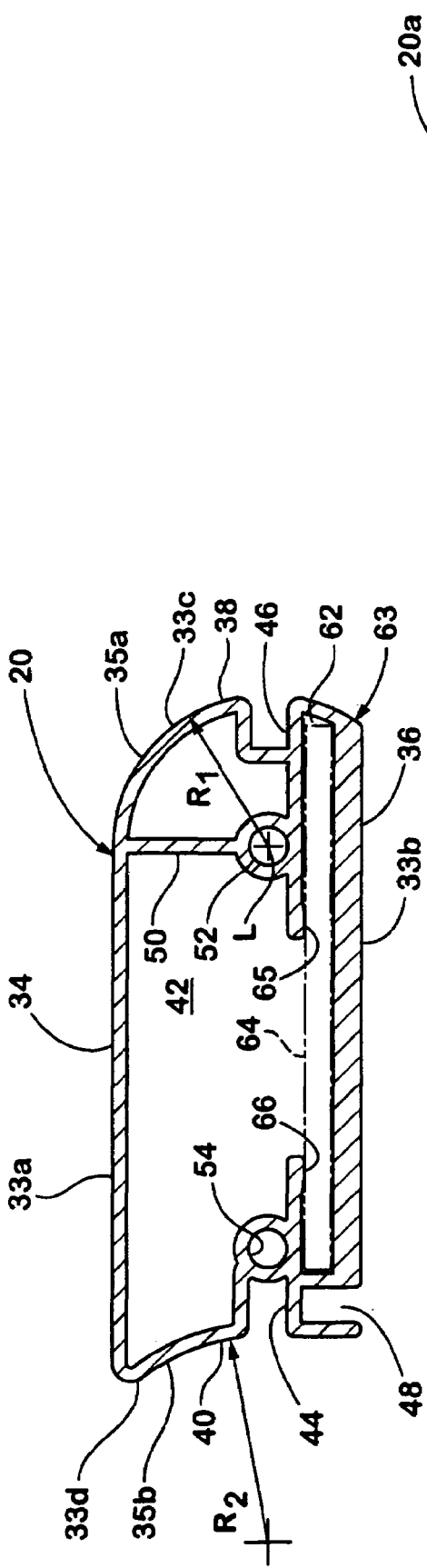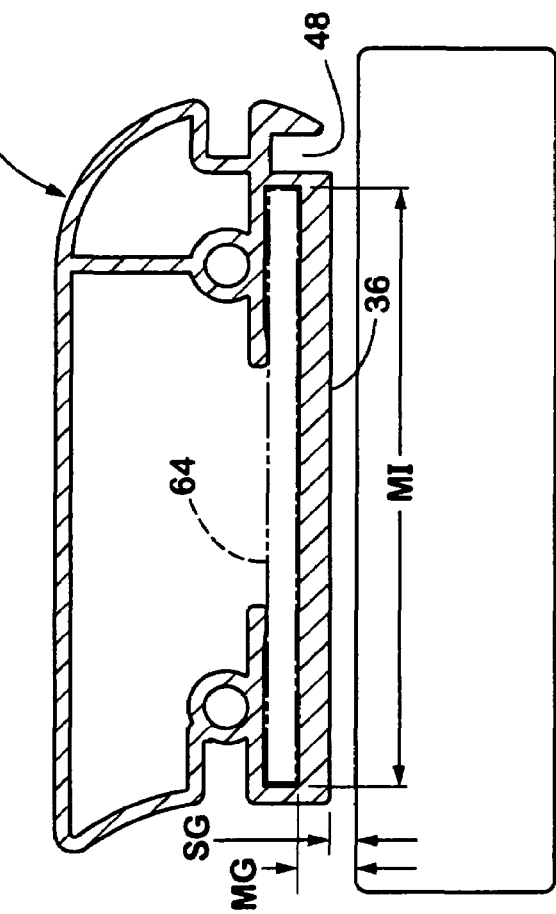
Fig. 2
Fig. 3

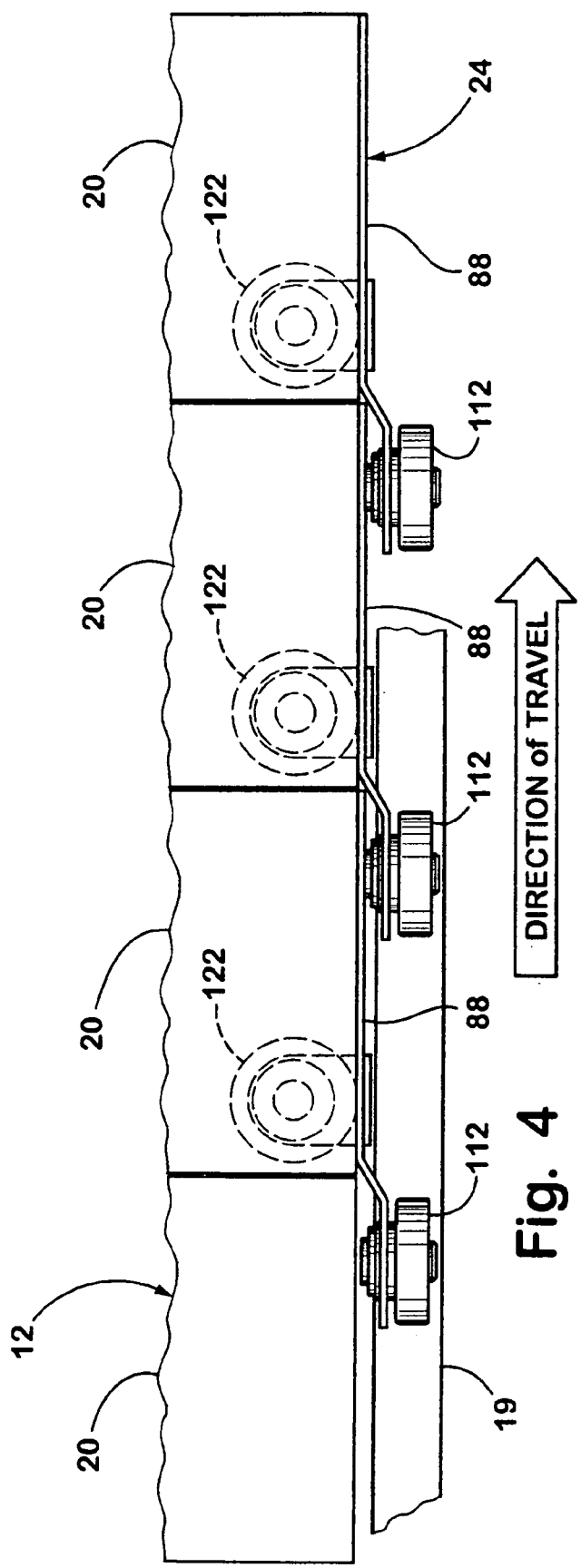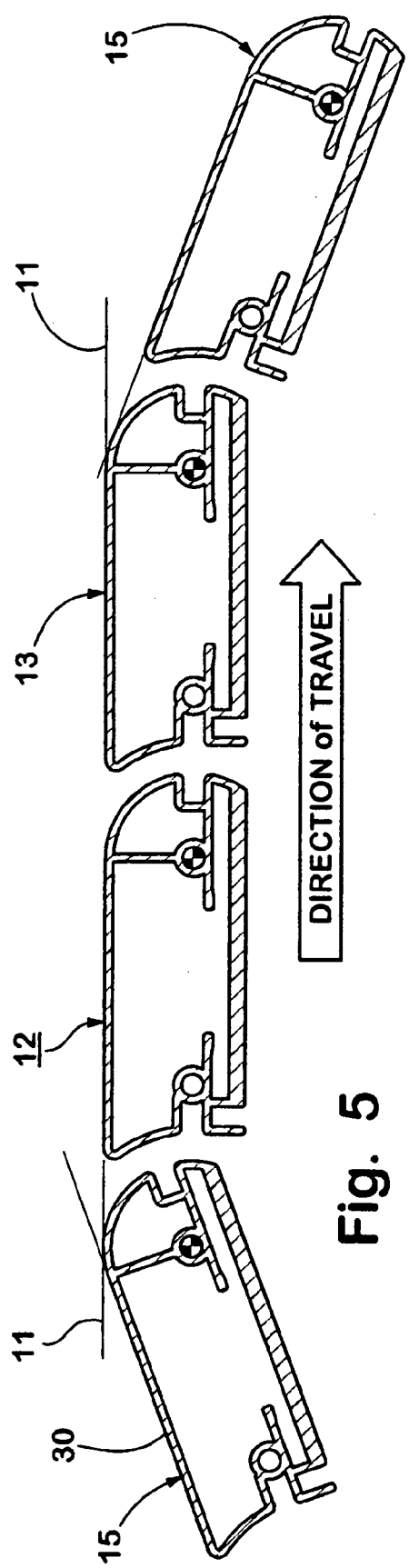

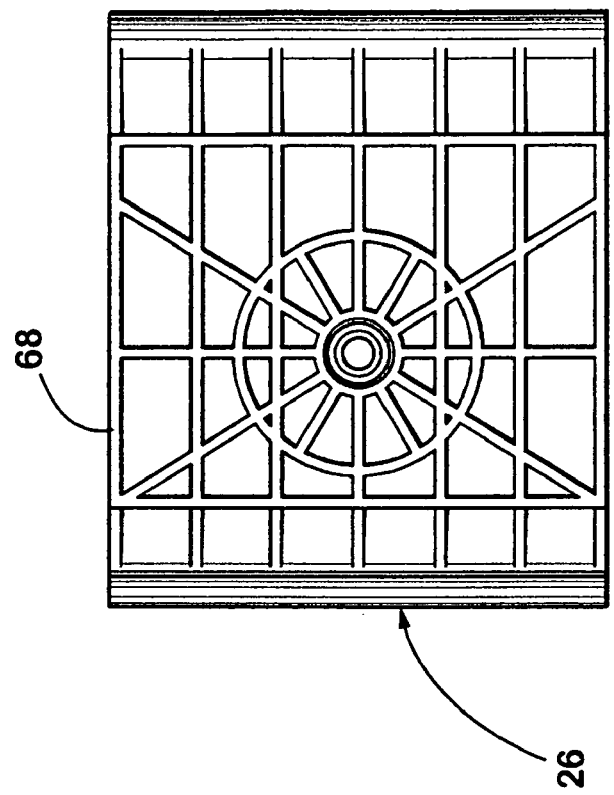
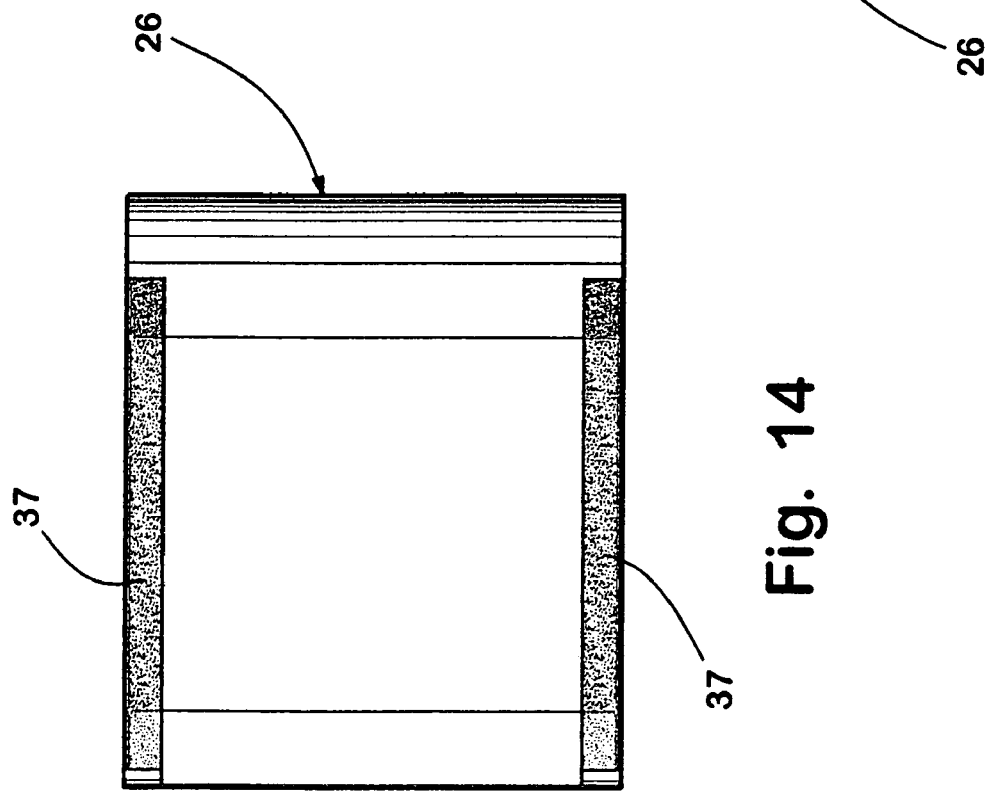

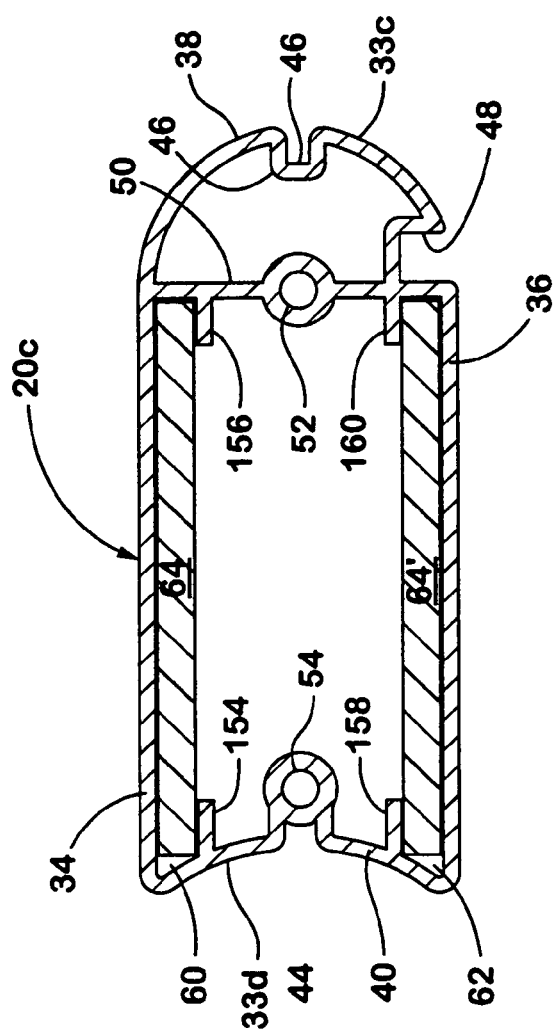
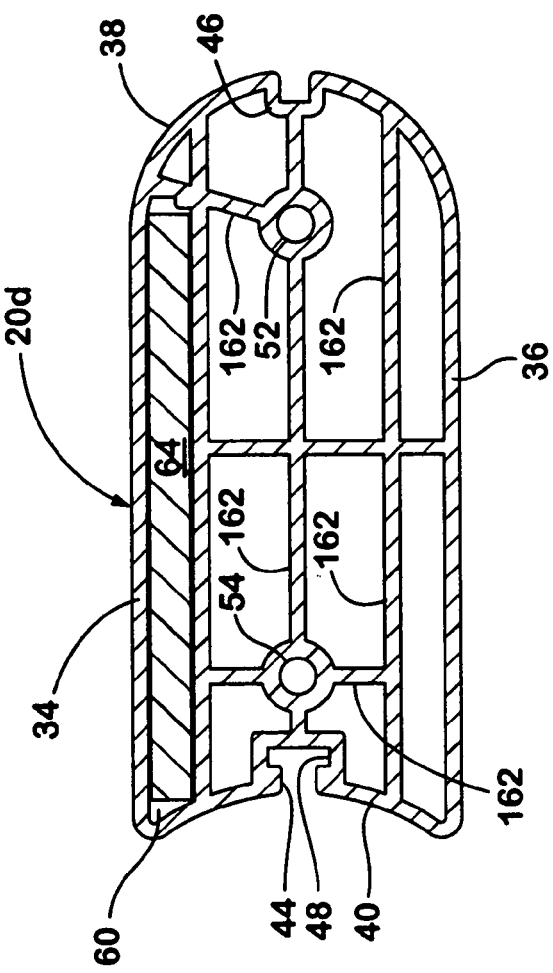
Fig. 21
Fig. 22

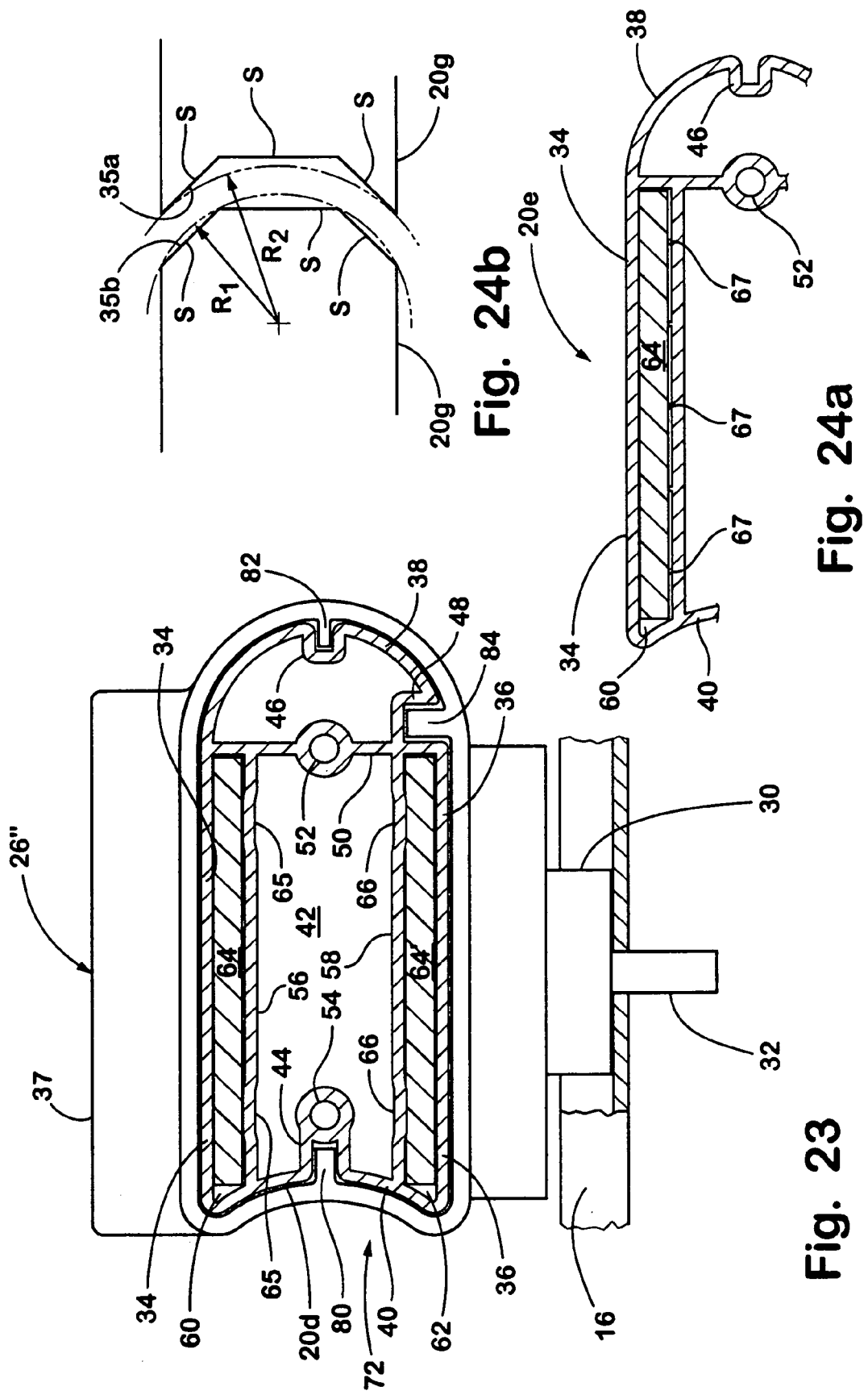

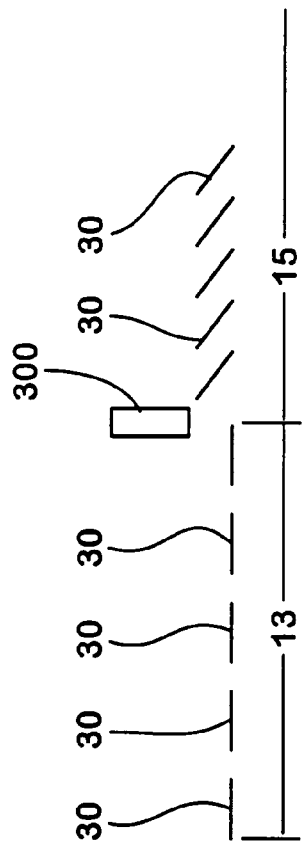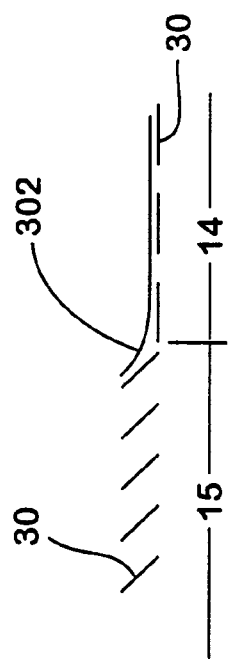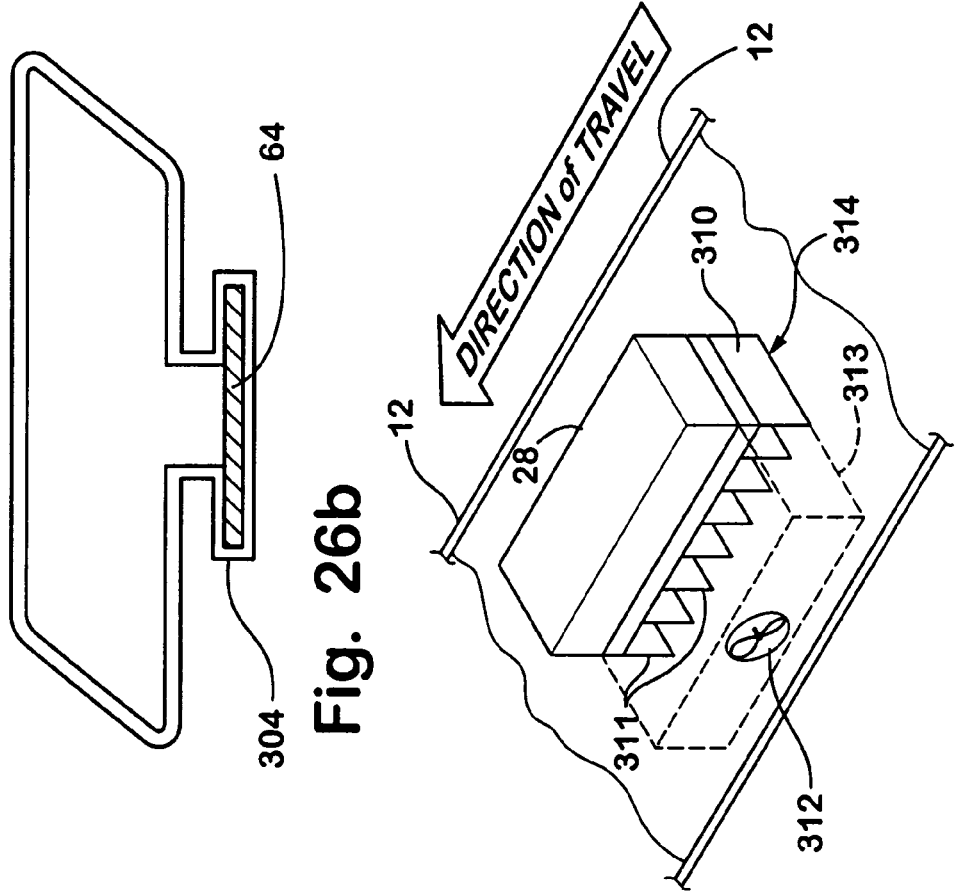

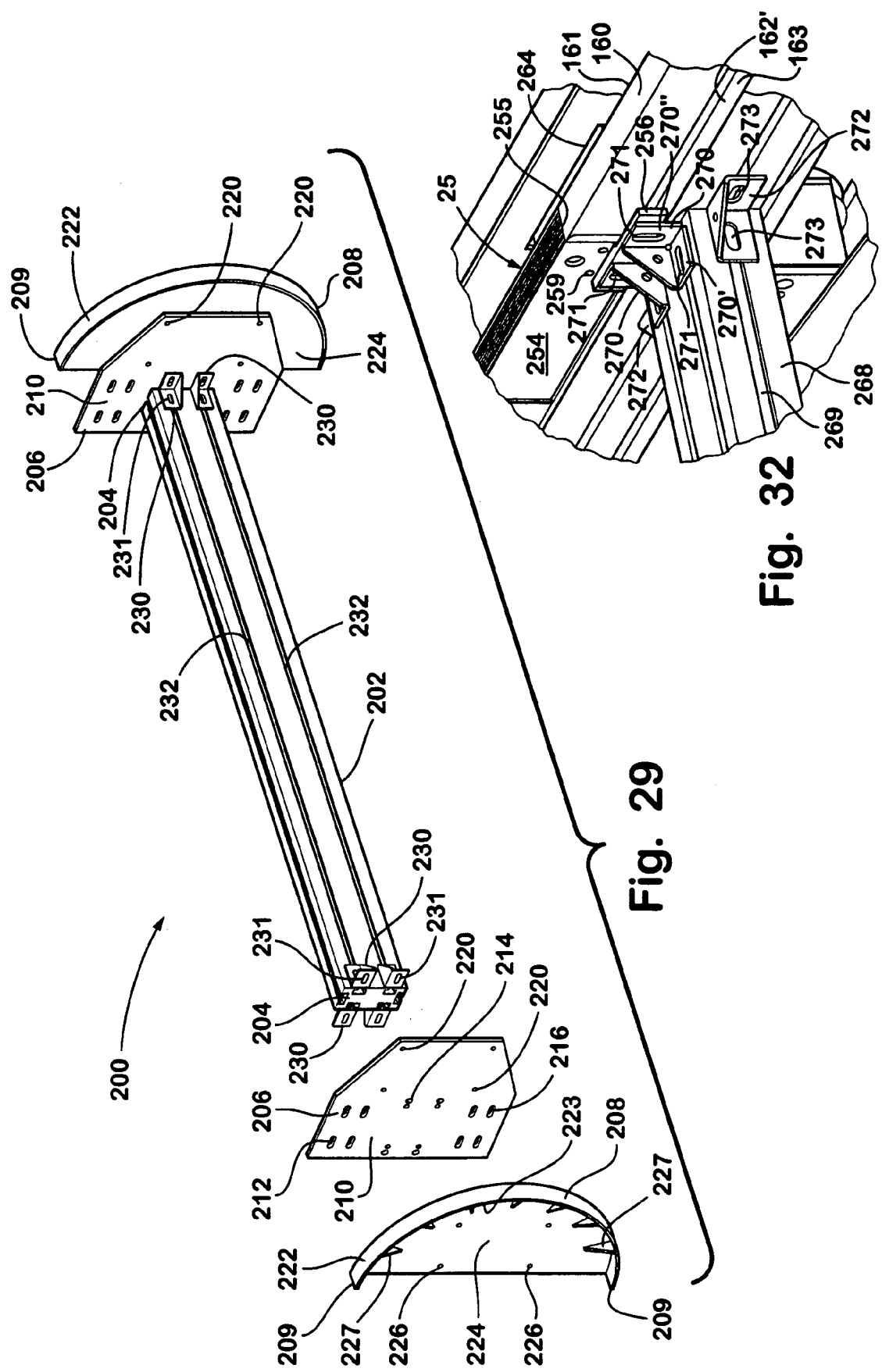

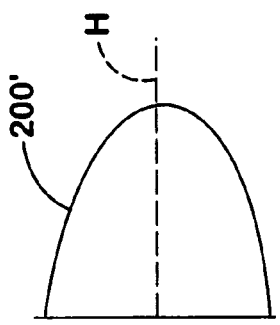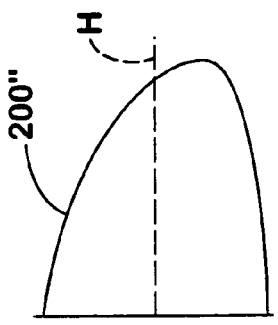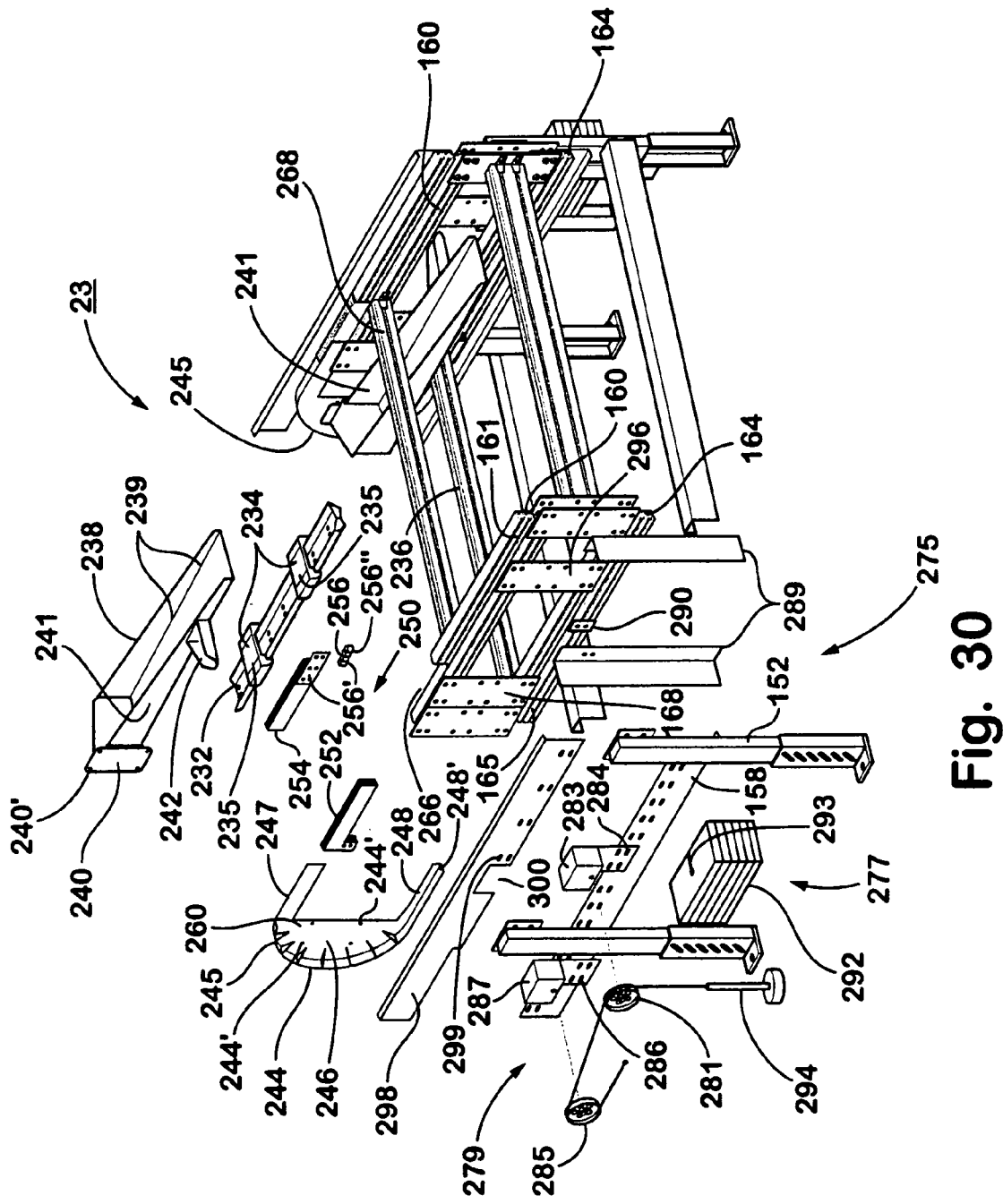

POSITIVE DISPLACEMENT SHOE AND SLAT SORTER APPARATUS AND METHOD

CROSS-REFERENCE TO RELATED APPLICATIONS

This application is a continuation of application Ser. No. 10/780,408, filed on Feb. 17, 2004, now U.S. Pat. No. 6,866,136, which is a division of application Ser. No. 09/968,742, filed on Sep. 28, 2001, now U.S. Pat. No. 6,814,216, which claims priority from provisional patent application Ser. No. 60/236,230, filed on Sep. 28, 2000, and provisional patent application Ser. No. 60/278,892, filed on Mar. 26, 2001, the disclosures of which are hereby incorporated herein by reference in their entirety.

BACKGROUND OF THE INVENTION

This invention relates generally to conveyor sortation systems and, in particular, to a positive displacement sorter of the pusher shoe and slat configuration.

Positive displacement sortation conveyors are known having a main conveying surface and diverter shoes that are generally used to displace articles laterally on the main conveying surface, such as when the articles are to be diverted upon one or more spur conveyor lines typically placed at an angle to the main conveying surface. Such conveyors may include a pair of endless chains and a plurality of members, such as slats, connected at their opposite ends to the chains in order to provide a moving conveyor surface. Each slat, or every other slat, is fitted with a pusher or diverter shoe mounted in a manner such that the shoe may glide laterally across the slat. Movement of the shoe is guided by a guide track beneath the conveying surface. At the loading end of the sortation system, the shoes have a particular orientation with respect to the conveying surface. When an article is to be diverted to a particular spur line, a diverter assembly is actuated to switch a portion of the shoes adjacent the article onto one or more diagonal tracks causing the effected shoes to glide across the slats to divert the article. Examples of such positive displacement sorters include commonly assigned U.S. Pat. Nos. 4,738,347 and 5,127,510. Other examples include U.S. Pat. Nos. 3,361,247; 5,409,095; and 4,884,677; and European Published Patent Applications EP 0 602 694 B1 and EP 0 444 734 A1.

In many instances, sortation conveyors are driven by rotary motors operatively connected to sprockets which propel the chains. As the application in which the sortation conveyors are used becomes increasing large, the size of the rotary motors must correspondingly increase in order to provide sufficient power to propel the longer conveying surface, as well as achieve the desired throughput. As the size of the motors and sprockets increases in order to meet the additional power requirements, the noise issued from the rotary motor, as well as the sizes of the sprockets and chains, correspondingly increase.

There is a long-felt need to increase the throughput of conveyor systems. Sortation conveyors and their associated induction conveyors are often the most challenging portion of the conveyor system to handle increasing demands for article throughput. Increase in throughput can be achieved by increasing the speed of the conveying surface. However, there are difficulties in continuously increasing the speed of the conveying surface. Another way to increase throughput is to decrease the gap between articles while ensuring sufficient gap to allow the articles to be properly diverted to their destination spur. As gaps get smaller to increase throughput, the necessity to maintain control over the gaps increases. Because gaps are established by placement of articles on the conveying surface of the sorter and the articles are placed on the conveying surface of the sorter from an induct conveyor, the requirement for smaller gaps increases the desirability to place and maintain the articles in proper position on the conveying surface of the sorter.

SUMMARY OF THE INVENTION

The present invention provides a unique positive displacement sorter apparatus and method of controlling same. Aspects of the present invention may be utilized with conventional motors, and a unique linear motor drive system and method of the present invention may be utilized with other positive displacement sorter configurations than those disclosed herein.

A positive displacement sorter apparatus, according to an aspect of the invention, includes means for defining a plurality of slats that are interconnected, thereby defining an endless web. An upper run of the web defines a conveying surface. The apparatus further including means for defining a plurality of pusher shoes gliding along at least some of the slats to laterally displace articles on the conveying surface. The apparatus further includes secondary means for defining a plurality of linear motor secondaries at the slats, primary means for inducing thrust in the secondaries and thereby propelling the web and control means for controlling the primary means.

The apparatus may include a wheel apparatus for supporting the web, the wheel apparatus having wheels at some of the slats rotating about an axis projecting from an interior of the associated slats. Each of the slats may have an upper surface portion that is substantially planar. Each of the slats may have an outer surface that does not extend above the conveying surface for all orientations of the slats. The primary and secondary means may be either a synchronous linear motor system or a non-synchronous linear motor system. The primary means may be between the upper and lower runs of the web. The secondary means may include magnet plates in the interior of the slats. The primary means may be adjacent an upper run of the web for propelling slats in the upper run and be positioned where the pusher shoe diverter assemblies are not positioned. The primary means may be adjacent a lower run of the web for propelling slats in the lower run from above and produce sufficient thrust to propel the web without elevating the slats in the lower run.

A positive displacement sorter apparatus, according to an aspect of the invention, includes a plurality of interconnected slats defining an endless web, the upper portion of the web defining a conveying surface and pusher shoes gliding along at least some of the plurality of slats to laterally displace articles on the conveying surface. Each of the slats has an outer surface including upper, lower and side surface portions. Either the front or rear surface portion is generally concave. The other of the front or rear surface portions is generally convex. In this manner, adjacent slats have cooperatively faced portions. Among the many advantages that may be achieved, this aspect of the invention provides for generally uniform gaps between the slats irrespective of orientation of the slats, such as when the slats are traveling between upper and lower web portions and the transition portions between the upper and lower web portions.

One of the generally concave and generally convex surface portions may have a first enclosing radius of curvature and the other of the generally concave and generally convex surface portions may have a second enclosing radius of curvature with the first and second enclosing radii having a common locus. At least one of the generally concave and generally convex surface portions may have a planar segment or may have an arcuate segment. The sorter apparatus may include a wheel apparatus for supporting the slats. The wheel apparatus may have a slat-support wheel at a locus of the radius of one of the arcuate portions. The upper surface portion of the slats may be substantially planar. The outer surface of the slats may be at or below the conveying surface for all orientations of the slats.

A positive displacement sorter apparatus, according to another aspect of the invention, includes a plurality of interconnected slats defining an endless web having upper and lower runs and transition portions between the upper and lower runs. The upper run of the web defines a conveying surface. Pusher shoes glide along at least some of the plurality of slats to laterally displace articles on the conveying surface. A linear motor propulsion system is provided for propelling the web. The linear motor propulsion system includes at least one motor primary and a plurality of motor secondaries at the slats. The at least one motor primary is between the upper and lower runs. Among the many advantages that may be achieved, the positioning of the at least one motor primary between the upper and lower runs reduces the vertical height of the sorter apparatus. This allows the sorter apparatus to be adapted to an increased number of applications without taking special precautions to accommodate a higher sorter apparatus.

A positive displacement sorter apparatus, according to another aspect of the invention, includes a plurality of interconnected slats defining an endless web having upper and lower runs and transition portions between the upper and lower runs. The upper run of the web defines a conveying surface. Each of the slats has a surface configuration. Pusher shoes glide along at least some of the plurality of slats to laterally displaced articles on the conveying surface. The sorter apparatus further includes a support track network and a wheel apparatus moveably supporting the endless web for movement on the support track network. The wheel apparatus includes at least one wheel supporting each slat and couplers for coupling adjacent ones of the slats. A relationship between the at least one wheel and the surface configuration substantially avoids a portion of the surface from extending above the conveying surface while slats are moving between the upper portion and the transition portion. Among the many advantages that may be achieved is the reduction of the likelihood that the outer surface of a slat making a transition to or from the conveying surface may inadvertently dislodge an article from its location.

The surface configuration may include a front and rear surface portion, one being generally concave and the other being generally convex. Each may be generally arcuate having a radius of curvature. The at least one wheel may be at a locus of one of the radii. The upper surface portion may be substantially planar.

A positive displacement sorter apparatus, according to an aspect of the invention, includes a plurality of interconnected slats defining an endless web, an upper surface portion of the web defining a conveying surface, and pusher shoes gliding along at least some of the plurality of slats to laterally displace articles on the conveying surface. A linear motor propulsion system includes at least one motor primary adjacent the web and a plurality of motor secondaries with the slats defining a magnetic interface between the at least one motor primary and any of the motor secondaries passing that motor primary. A lateral stabilizer is provided between each of the pusher shoes in the corresponding ones of the slats. Among the many advantages that may be achieved, this provides the lateral stabilizer without interfering with the air gap between the at least one motor primary and the motor secondaries.

The lateral stabilizer may include a portion of the shoe that is laterally extending and projecting in a recess in the slat, with the lateral stabilizer being substantially outside of the magnetic interface. Each of the slats may have a surface including a lower surface portion. The lateral stabilizer may be at the lower surface portion. The motor secondaries may be adjacent the lower surface portion. The lateral stabilizer may be forward of the magnetic interface with respect to movement of the web or may be rearward of the magnetic interface with respect to movement of the web. The motor secondaries may be fixed within the associated slats.

A positive displacement sorter apparatus, according to another aspect of the invention, includes a plurality of interconnected slats defining an endless web. An upper portion of the web defines a conveying surface. Pusher shoes glide along at least some of the plurality of slats to laterally displace articles on the conveying surface. A support track network is provided, and a wheel apparatus moveably supports the endless web for movement on the support network. Each of the slats is made up of an outer wall having an upper wall portion and a lower wall portion. Each of the slats is mounted to the wheel apparatus with the associated wheel rotating about an axis projecting to the interior of the associated slat. Among the many advantages that may be achieved, this keeps the mass of the slats close to the support track network, thereby reducing acceleration forces on the web as the web transitions between the upper and lower runs.

The wheel apparatus may further include a plate apparatus coupling adjacent slats. The wheel may be rotatably supported by a shaft connected with adjacent ones of the plates, thereby pivotally joining adjacent slats to pivot at the axis mounting the wheel. The mounting member may be substantially closer to the lower wall portion than to the upper wall portion. Among the many advantages that may be achieved, this further shortens the distance between the bottom of the slat and the track apparatus, thereby allowing for a lesser radius at the transition portions of the web, thereby minimizing vertical height of the sorter apparatus. This is especially advantageous for pusher shoes having elongated members below each of the pusher shoes because it allows the radius of the transition portion to be reduced without allowing interference between the elongated members. A plurality of diverter assemblies may be provided for selectively laterally diverting the pusher shoes. The diverter assemblies interact with elongated members.

A positive displacement sorter apparatus, according to another aspect of the invention, includes a plurality of interconnected slats defining an endless web having upper and lower portions and transition portions between the upper and lower portions. The upper portion of the web defines a conveying surface. Pusher shoes glide along at least some of the slats to laterally displace articles on the conveying surface. A support track network has upper and lower track portions and transition track portions between the upper and lower track portions. A wheel apparatus moveably supports the endless web for movement on the support track network. At least one of the support track network transition track portions has a support surface that is a non-circular curve. Among the many advantages that may be achieved, this allows acceleration forces on the slats and shoes to be controlled as the slats and shoes move through the transition portion having this configuration, thereby allowing the acceleration forces to be controlled in a manner that may reduce the noise of the web movement.

The support surface may be substantially non-symmetrical about a horizontal axis. The support surface may have generally larger radii of curvature above the horizontal axis than below the horizontal axis, or vice versa. The support surface may be substantially symmetrical about a horizontal axis. The transition track portion may include a moveable portion to accommodate expansion and contraction of the web. An expansion joint may be provided between the moveable portion and the remainder of the support track network to provide track network continuity between the moveable portion and the remainder of the support track. A force-producing member may apply a force on the moveable portion, which may be a substantially constant force irrespective of position of the moveable portion.

A positive displacement sorter apparatus, according to another aspect of the invention, includes a plurality of interconnected slats defining an endless web having upper and lower portions and transition portions between the upper and lower portions. The upper portion of the web defines a conveying surface. Pusher shoes glide along at least some of the plurality of slats to laterally displace articles on the conveying surface. A support track network and a wheel apparatus moveably support the endless web for movement on the support track network. The support track network includes a stationary portion, a moveable portion to accommodate expansion and contraction of the web and an expansion joint between the stationary and moveable portions to provide track network continuity between the stationary and moveable portions. Among the many advantages that may be achieved, this allows the wheel apparatus to maintain contact with the support track network.

The expansion joint may include a plurality of interlaced fingers. A force-producing member may apply a force on the moving portion. The force-producing member may produce a substantially constant force irrespective of the position of the moveable portion. The moveable portion may be generally horizontally moveable.

A positive displacement sorter apparatus, according to another aspect of the invention, includes a plurality of interconnected slats defining an endless web having upper and lower portions and transition portions between the upper and lower portions. The upper portion of the web defines a conveying surface. Pusher shoes glide along at least some of the plurality of slats to laterally displace articles on the conveying surface. A support track network and a wheel apparatus moveably support the endless web for movement on the support track network. The support track network includes a stationary portion, a moveable portion and a force-producing member. Movement of the moveable portion with respect to the stationary portion accommodates expansion and contraction of the web. The force-producing member applies a substantially constant force on the moveable portion irrespective of position of the moveable portion. Among the many advantages that may be achieved, this provides a more consistent tension on the web, which, in turn, provides for more consistent movement of the web irrespective of the expansion or contraction of the web.

The force-producing member may apply a substantially horizontal force on the moveable portion. The force-producing member may include a weight apparatus and a cable system for translating gravitational force produced by the weight apparatus to an outwardly directed force on the moveable portion. The weight apparatus may have a mass that is adjustable. The sorter apparatus may include an expansion joint between the moveable portion and the stationary portion.

A positive displacement sorter apparatus, according to another aspect of the invention, includes a plurality of interconnected slats defining an endless web having upper and lower portions and transition portions between the upper and lower portions. The upper portion of the web defines a conveying surface. Pusher shoes glide along at least some of the plurality of slats to laterally displace articles on the conveying surface. The apparatus includes a support track network and a wheel apparatus moveably supporting the endless web for movement on the support track network. A plurality of diverters and associated diverter rails are provided for selectively displacing ones of the pusher shoes laterally of the conveying surface to displace articles on the conveying surface. A frame is provided for supporting the support track network, the diverters and diverter assemblies. The frame includes at least two longitudinal horizontal members. The horizontal members define fastener channels along the horizontal members. The diverters and diverter rails can be selectively mounted at chosen positions along the frame by fasteners engaging the fastener channels. Among the many advantages that are achieved, this allows the sorter apparatus to be designed from common assemblies irrespective of the application by allowing the location of the spurs, and the associated components to be positioned along the support frame without the necessity for special configuration of the support frame.

The horizontal members may be extruded members. The frame may include support legs, which may be selectively mounted at chosen positions along the frame by fasteners engaging the fastener channels. The sorter apparatus may include a plurality of cross braces between the horizontal members. The cross braces may be mounted at chosen positions along the frame by fasteners engaging the fastener channel. The sorter apparatus may include a linear motor propulsion system for the web. The linear motor propulsion system may include at least one motor primary adjacent the web and a plurality of motor secondaries with the slats. The at least one motor primary may be selectively mounted at a chosen position along the frame by fasteners engaging the fastener channels.

A positive displacement sorter apparatus, according to an aspect of the invention, includes a plurality of interconnected slats defining an endless web, an upper portion of the web defining a conveying surface and pusher shoes gliding along at least some of the plurality of slats to laterally displace articles on the conveying surface. A closed-loop propulsion system for the endless web is provided. The propulsion system includes at least one motor, a web sensor for sensing movement of the web and a control that is responsive to the web sensor to excite the at least one motor in a manner that reduces speed fluctuations resulting from variations in article loading of the endless web. Among the many advantages that are achieved, this allows more accurate positioning of articles on the conveying surface from the upstream conveying system, such as an induction conveyor, by ensuring a more accurate speed relationship between the upstream conveying system and the sorter conveying surface by providing a more closely regulated speed of the sorter conveying surface. This feature is especially beneficial as the loading on the conveying surface varies substantially.

The web sensor may be a slat sensor, such as a proximity sensor, an optical sensor, an ultrasonic sensor, a microwave sensor, or the like. The web sensor may identify transitions between the slats. The web sensor may further identify at least one particular slat. This may be accomplished by a Hall-effect sensor and at least one magnet in a particular slat. The web sensor identifies the at least one particular slat by identifying the magnet with the Hall-effect sensor. The web sensor may further identify multiple particular slats.

A positive displacement sorter apparatus, according to another aspect of the invention, includes a plurality of interconnected slats defining an endless web having upper and lower portions and transition portions between the upper and lower portions. The upper portion of the web defines a conveying surface. Pusher shoes glide along at least some of the plurality of slats to laterally displace articles on the conveying surface. A linear motor propulsion system is provided for propelling the web. The propulsion system includes at least one motor primary adjacent the web and a plurality of motor secondaries with the slats. The at least one motor primary propels slats in the lower portion from above. Among the many advantages that are achieved, this allows the linear motor primary to be positioned in a manner that minimizes vertical height of the apparatus.

The linear motor propulsion system may be configured to produce sufficient thrust to propel the web without substantially elevating the slats in the lower portion. Among the many advantages that are achieved, this allows the linear motor primary to be positioned where desired without resulting in an increase in noise from elevating the slats against gravitation resulting in a noise created by the motion of the web. A support track network and a wheel apparatus moveably supporting the endless web for movement on the support track network may be provided, wherein the support track network supports the lower run from below the slats. The apparatus may further include a plurality of diverter assemblies to selectively divert the pusher shoes and at least one other motor primary propelling slat in the upper portion from below the slats in the upper portion. The at least one other motor primary may be positioned where the diverter assemblies are not positioned.

A positive displacement sorter apparatus, according to another aspect of the invention, includes a plurality of interconnected slats defining an endless web and an upper run of the web defining a conveying surface. Pusher shoes glide along at least some of the plurality of slats to laterally displace articles on a conveying surface. A linear motor propulsion system propels the web. The linear motor system includes at least a motor primary and a plurality of motor secondaries at the slats. The motor secondaries include magnet plates that are retained in the associated slats by being fixed from within the associated slats. Among the many advantages that are achieved, this facilitates apparatus of the secondaries to the associated slats and secures positioning of the magnet plates within the slats.

The motor magnet plates may be fixed within the associated slats by interference fit. The motor magnet plates may be fixed within the associated slats by deforming portions of the slats. The motor magnet plates may be fixed within the associated slats by dimensional interference between the motor magnet plates and the associated slats. The motor magnet plates may be fixed within the associated slats by inserts in the slats, or adhesive, or by welding. The slats may be extruded and may include pockets for the motor magnet plates. A plurality of motor magnet plates may be provided in each of the slats. This allows the slat to be propelled from linear motor primaries on opposite sides of the web surfaces.

Any of the positive displacement sorter assemblies discussed above may include a linear propulsion system for the web, which may be chosen from a synchronous linear motor system or a non-synchronous linear motor system. The propulsion system may include at least one motor primary adjacent the web and a plurality of motor magnet plates with the slats. The at least one motor primary may be between the upper and lower runs of the web. The motor magnet plates may be in the slats. A plurality of diverter assemblies may be provided to selectively laterally divert the pusher shoes. The at least one motor primary may be adjacent an upper run of the web and adapted to propel slats in the upper run. The at least one motor primary may be positioned where the diverter assemblies are not positioned. The at least one motor primary may be adjacent the lower run of the web and adapted to propel slats in the lower run from above. The at least one primary motor may be configured to produce sufficient thrust to propel the web without substantially elevating the slats in the lower run.

A method of sorting articles, according to an aspect of the invention, includes providing a plurality of interconnected slats defining an endless web, an upper portion of the web defining a conveying surface and providing pusher shoes gliding along at least some of the plurality of slats to laterally displace articles on the conveying surface. The method further includes providing a web sensor and sensing movement of the web with the web sensor and providing a propulsion system comprising at least one motor. The method further includes exciting the at least one motor at least as a function of an output of the web sensor thereby reducing speed fluctuations resulting from variations in article loading of the endless web. Among the many advantages that are achieved, this method provides more accurate positioning of articles on the conveying surface from the upstream conveying system, such as an induction conveyor, by assuring a more accurate speed relationship between the upstream conveying system and the sorter-conveying surface.

The web sensor may be a slat sensor, such as a proximity sensor, an optical sensor, an ultrasonic sensor, a microwave sensor, or the like. The method may further include identifying transitions between slats with the proximity sensor. The method may further include identifying at least one particular slat with the web sensor. The web sensor may include a Hall-effect sensor and the at least one particular slat may include a magnet, wherein identifying the at least one particular slat may include identifying the magnet with the Hall-effect sensor.

The propulsion may be a linear motor propulsion system and the at least one motor may be at least one linear motor primary and a plurality of motor secondaries with the slats. The at least one linear motor primary may be a plurality of linear motor primaries and the method may further include exciting the plurality of linear motor primaries as a function of the output of the web sensor. The exciting of the plurality of linear motor primaries may include supplying digital signals to the plurality of linear motor primaries and adjusting the linear motor primaries with the digital signals.

A method of sorting articles, according to another aspect of the invention, includes providing a plurality of interconnected slats defining an endless web having upper and lower runs and transitions runs between the upper and lower runs. The upper run of the web defines a conveying surface. The method further includes providing pusher shoes gliding along at least some of the plurality of slats. The method further includes providing the linear motor propulsion system for propelling the web. The propulsion system includes at least one motor primary adjacent the web and a plurality of motor secondaries with the slats. The method further includes propelling slats in the lower run from above with the at least one motor primary. The method further includes laterally displacing articles on the conveying surface with the pusher shoes. Among the many advantages that are achieved, this method allows the linear motor primary to be positioned where desired.

The method may further include producing sufficient thrust to propel the web without elevating the slats in the lower portion. This reduces noise from elevating the slat against gravitation resulting in a noise created by the motion of the web. Another motor primary may be provided to propel slats in the upper run from below the slats in the upper run. Diverter assemblies may be provided to laterally divert the pusher shoes. The at least one other motor primary may be between adjacent ones of the diverter assemblies.

A method of sorting articles, according to another aspect of the invention, includes providing a plurality of interconnected slats defining an endless web having upper and lower runs and transition portions between said upper and lower runs. The upper run of the web defining a conveying surface. Pusher shoes are provided gliding along at least some of the plurality of slats. A linear motor propulsion system is provided including at least one motor primary and a plurality of motor secondaries at the slats. The at least one motor primary is positioned between the upper and lower runs, and the plurality of motor magnet plates are with the slats. The method further includes laterally displacing articles on the conveying surface with the pusher shoes. Among the many advantages that are achieved, this method allows sorting of articles within a vertical space that is small. The magnet plates may be in the slats.

Any of the above-identified methods may include providing a linear motor propulsion system that is chosen from one of a synchronous linear motor system and a non-synchronous linear motor system. The method may further include providing the at least one motor primary between upper and lower runs of the web and may include providing magnet plates in the slats. The method may further include providing a plurality of diverter assemblies and selectively diverting the pusher shoes with the diverter assemblies. The at least one motor primary may be provided adjacent an upper run of the web and propelling slats in the upper run from below. The at least one motor primary may be positioned where the diverter assemblies are not positioned. The at least one motor primary may be positioned adjacent the lower run of the web and propelling slats in the lower run from above with the at least one motor primary. The at least one motor primary may provide sufficient thrust to propel the web without elevating the slats in the lower run. The method may include propelling the web at a reduced speed when articles are not being provided to the conveying surface. The method may further include providing magnet plates in the slats and fixing the magnet plates from within the associated slats. The magnet plates may be fixed within the associated slats by at least one of interference fit, inserts, adhesive or welding.

These and other objects, advantages and features of this invention will become apparent upon review of the following specification in conjunction with the drawings.

BRIEF DESCRIPTION OF THE DRAWINGS

FIG. 2 is a side elevation of a slat;

FIG. 3 is the same view as FIG. 2 of an alternative embodiment thereof;

FIG. 4 is a top plan view of an endless web;

FIG. 5 is a side elevation of the endless web in FIG. 4;

FIG. 13 is a bottom plan view of the pusher shoe in FIG. 10;

FIG. 14 is a top plan view of the pusher shoe in FIG. 10;

FIG. 21 is the same view as FIG. 2 of an alternative embodiment thereof;

FIG. 22 is the same view as FIG. 2 of an alternative embodiment thereof;

FIG. 23 is the same view as FIG. 2 of an alternative embodiment thereof;

FIG. 24a is the same view as FIG. 2 of an alternative embodiment thereof;

FIG. 24b is the same view as FIG. 2 of an alternative embodiment thereof;

FIGS. 26a and 26b are the same view as FIG. 2 of alternative embodiments thereof;

FIG. 29 is an exploded perspective view of a frame end;

FIG. 30 is an exploded perspective view of a take-up assembly;

FIG. 32 is a perspective view of an expansion joint;

FIGS. 35a and 35b are alternative embodiments of a frame end;

FIGS. 36a and 36b are respective top and bottom plan views of shoe transfer assemblies moving from the top run of the web to a transition portion and to the bottom run; and FIG. 37 is a perspective view of a linear motor primary showing a cooling system therefor.

DESCRIPTION OF THE PREFERRED EMBODIMENT

Figure 1:
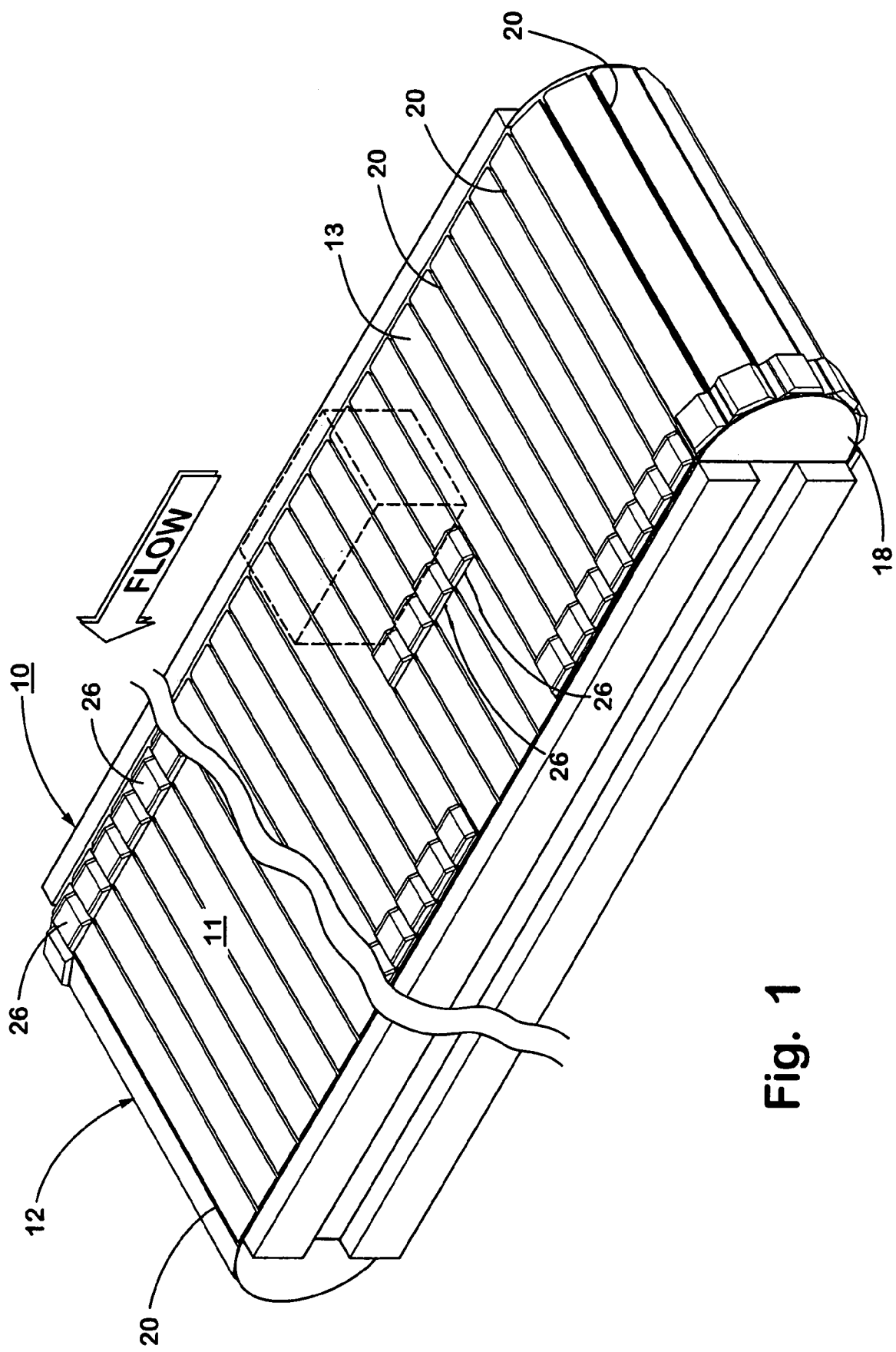
FIG. 1 is a perspective view of a positive displacement shoe and slat sorter assembly, according to the invention.
Figures 6A, 6B:
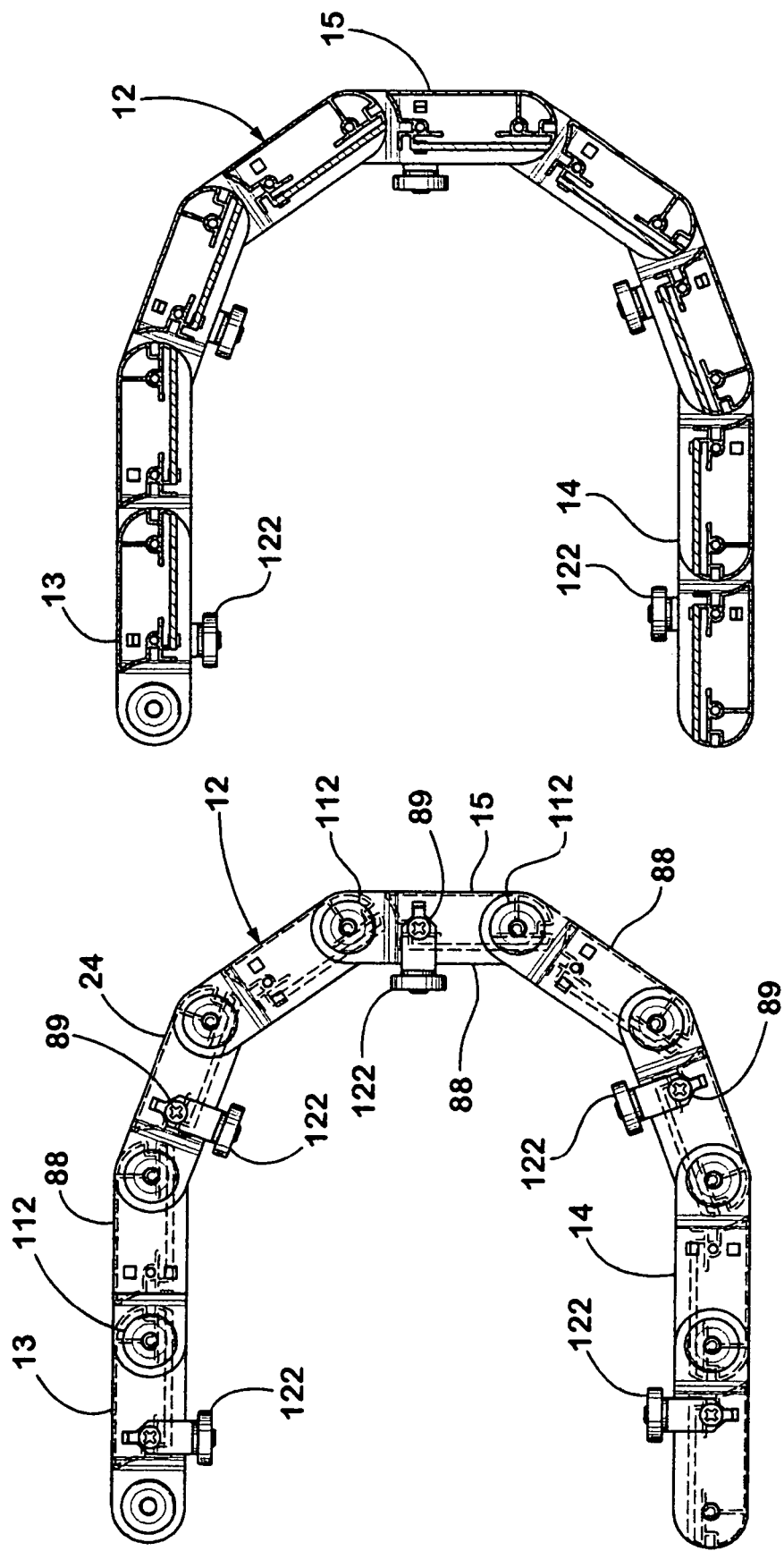
FIG. 6a is a side elevation of a transition portion of the endless web in FIG. 4.
FIG. 6b is the same view as FIG. 6a with a portion of the wheel assembly removed.
Figure 7:
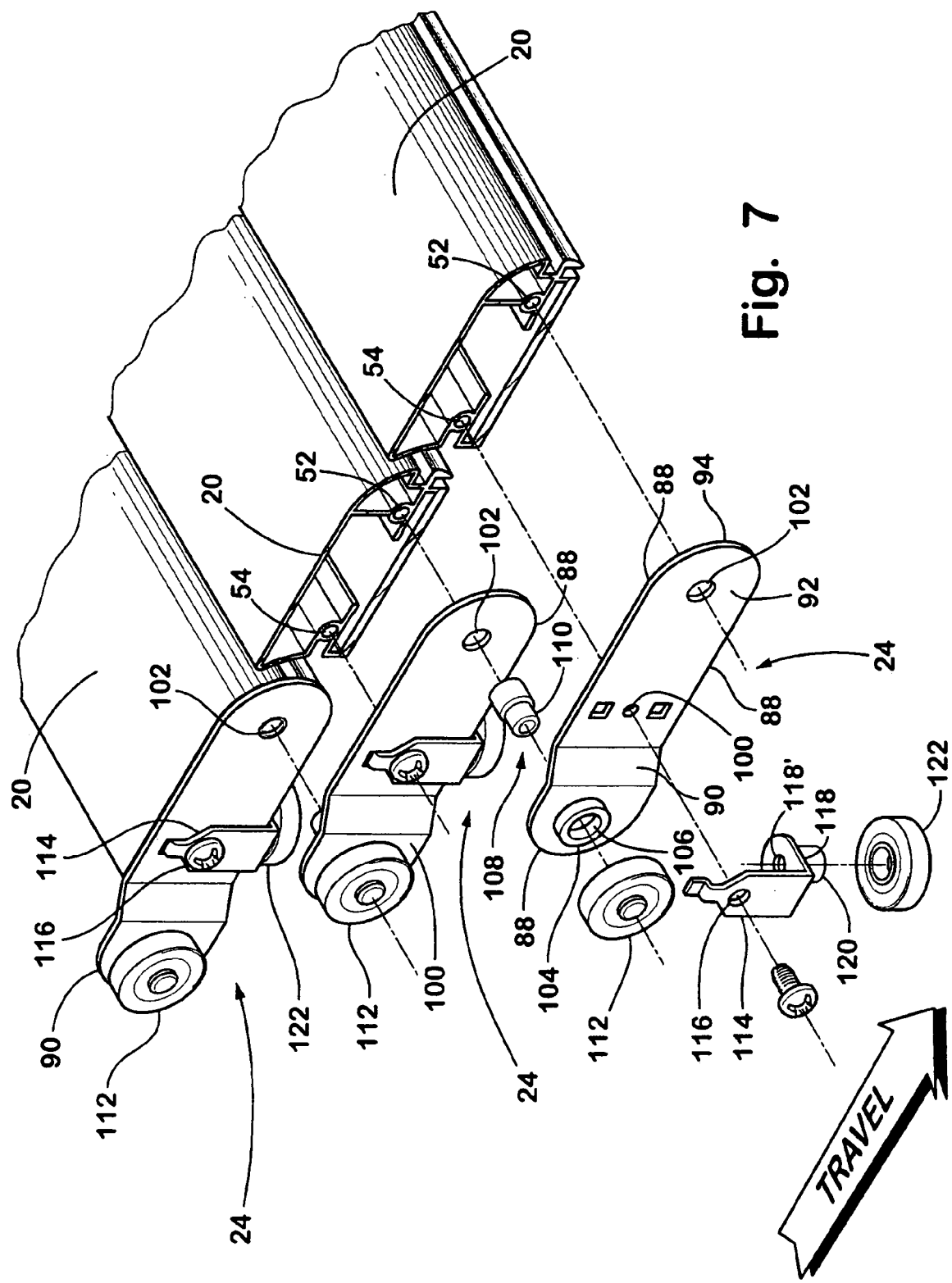
FIG. 7 is an exploded perspective view of an endless web wheel assembly.
Figure 15:
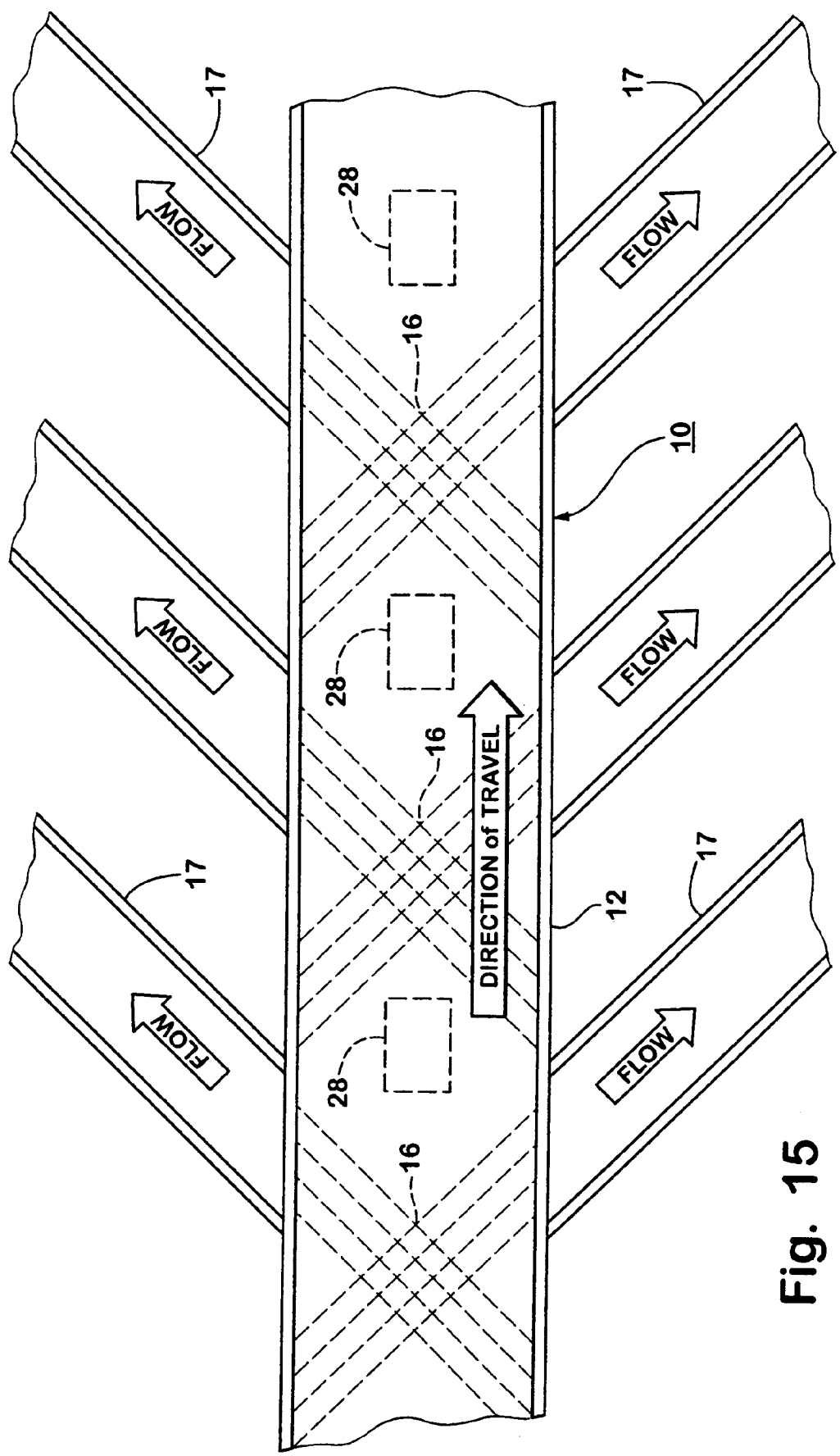
FIG. 15 is a top plan view of a positive displacement shoe and slat sorter system, according to the invention.

Referring now specifically to the drawings, and the illustrative embodiments depicted therein, a sorter assembly 10 is made up of a plurality of slats 20, which are interconnected in an endless web 12 with pusher shoes, or diverter shoes, 26 gliding along some or all of the slats to laterally displace articles on a conveying surface 11 defined by a top run 13 of endless web 12 (FIG. 1). Diverter assemblies 16 laterally displace pusher shoes 26 to divert articles onto selected spurs 17 in order to sort the articles (FIG. 15). To do this, diverter assemblies 16 include diverter rails extending diagonally across the conveying surface beneath the web and diverter switches to divert pusher shoes to individual diverter rails. Each of the slats has an outer surface 33, including an upper surface portion 33a, a lower surface portion 33b, a forward surface portion 33c and rear surface portion 33d (FIGS. 2 and 3).

Sorter assembly 10 may be of the parallel divert type as disclosed in commonly assigned U.S. Pat. No. 5,165,515; of the diagonal divert type as disclosed in commonly assigned U.S. Pat. No. 5,127,510; or a combination of the parallel and diagonal divert type as disclosed in commonly assigned U.S. Pat. Nos. 6,041,909 and 5,927,465, which are all hereby incorporated herein by reference.

Upper surface portion 33a is defined by an upper wall 34. Lower surface portion 33b is defined by a lower wall 36. Forward surface portion 33c is defined by a front wall 38. Rear surface portion 33d is defined by a rear wall 40. The terms "front" and "rear" are relative terms to assist in understanding the disclosed embodiment and should not be considered limiting. Indeed, although endless web 12 may move in the direction of forward surface portion 33c leading, it is also capable of moving in the direction of rear surface portion 33d leading. References to "upper" and "lower," and the like, with respect to a slat or a pusher shoe are relative to the slat or the shoe in the upper run of the web. The terms "longitudinal" or "longitudinally" refer to direction of movement of the endless web. The terms "lateral" or "laterally" refer to direction from side-to-side of the conveying surface, or perpendicular to direction of movement. In the illustrative embodiment, upper surface portion 33a is generally planar, meaning that it is sufficiently planar to present a generally continuous conveying surface 11, but may have various surface features in the upper surface portion 33a, such as ridges, valleys, and the like.

Forward surface portion 33c has a generally convex portion 35a. Rear surface 33d has a generally concave portion 35b. As used herein, the term "convex" means curved or rounded in cross-section taken through a longitudinally oriented vertical plane, like the exterior of a circle, or the term "convex" may also mean being a continuous function, or part of a continuous function, with the property that a line joining any two points on its graph lies on or above the graph. The term "convex" may also mean concave inwardly. As used herein, the term "concave" means hollowed or rounded inward in cross-section taken through a longitudinally oriented vertical plane. The term "concave" may also mean the side of a curve or surface on which neighboring normals to the curve or surface converge and on which lies the chord joining two neighboring points of the curve or surface. The term "concave" may also mean concave outwardly. The surface portions 35a, 35b of adjacent slats have common-faced portions that maintain their common interface through normal changes and orientations of the slats as they move about the endless web 12. This assists in maintaining a generally constant gap between adjacent slats as the slats move throughout the endless web 12. In the embodiment illustrated in FIGS. 2 and 3, the facing portions 35a, 35b are generally arcuate. However, they may be made up of a series of surface segments, such as planar segments S, that are not arcuate, but form facing convex and concave surfaces, as shown, for example, in FIG. 24b, or may be a combination of arcuate and planar surface segments. Further, as shown in FIGS. 2 and 3, the concave and convex surfaces may be asymmetrical above and below their respective vertical midpoints, but may, alternatively, be symmetrical above and below the vertical wide points.

One of the front surface 33c and the rear surface 33d forms a protrusion. The other forms a recess so that the protrusion on one slat is positioned adjacent the recess of the other so that the surfaces have cooperative positioning. One of surfaces 33c and 33d may penetrate the recess of the other surface or it may not penetrate the recess of the other surface. In embodiments in which one of the surfaces 33c and 33d penetrates the other surface, a linear vertical passage between adjacent surfaces 33c and 33d is beneficially avoided and, thus, the potential for objects becoming lodged between adjacent surfaces 33c and 33d is reduced. Convex surface portion 35a has an enclosing radius $R_1$, which shares a common locus L with an enclosing radius $R_2$ of concave surface portion 35b. The term enclosing radius means the radius of an arcuate portion, such as seen in FIG. 2, or the radius of the closest fitting arcuate portion of the planar sections S, such as seen in FIG. 24b. Radius $R_2$ may be greater than or equal to radius $R_1$.

Slats 20 are maintained in their respective position in endless web 12 by a wheel assembly 24 (FIGS. 4–8). Wheel assembly 24 includes at least one wheel 112, which is rotatably mounted about an axis that passes laterally to interior 42 of slat 20. This may be accomplished by rotatably mounting wheel 112 at a mounting member, such as circular channel 52. Circular channel 52 is generally at the loci of radii $R_1$ for convex surface portion 35a of forward surface portion 33c. This allows convex surface portion 35a to maintain a substantially constant height with respect to adjacent slats as the slats move throughout endless web 12. More particularly, sortation assembly 10 additionally includes a frame 18 defining a support track network 19, made up of corresponding lateral tracks 19a, 19b on opposite lateral sides of frame 18. With wheel assembly 24 riding on respective support tracks of support track network 19, each slat pivots about the axis of rotation of wheel 112 positioned at mounting member 52. As a result, as slats move toward and away from top run 13, from and to transition portions 15, there is substantially no portion of surface 33 which extends above conveying surface 11, as can best be seen in FIG. 5. This avoids the misalignment of articles on conveying surface 11 by protruding portions of a slat as the slat moves from a transition portion to or from the top run 13.

Figure 8:
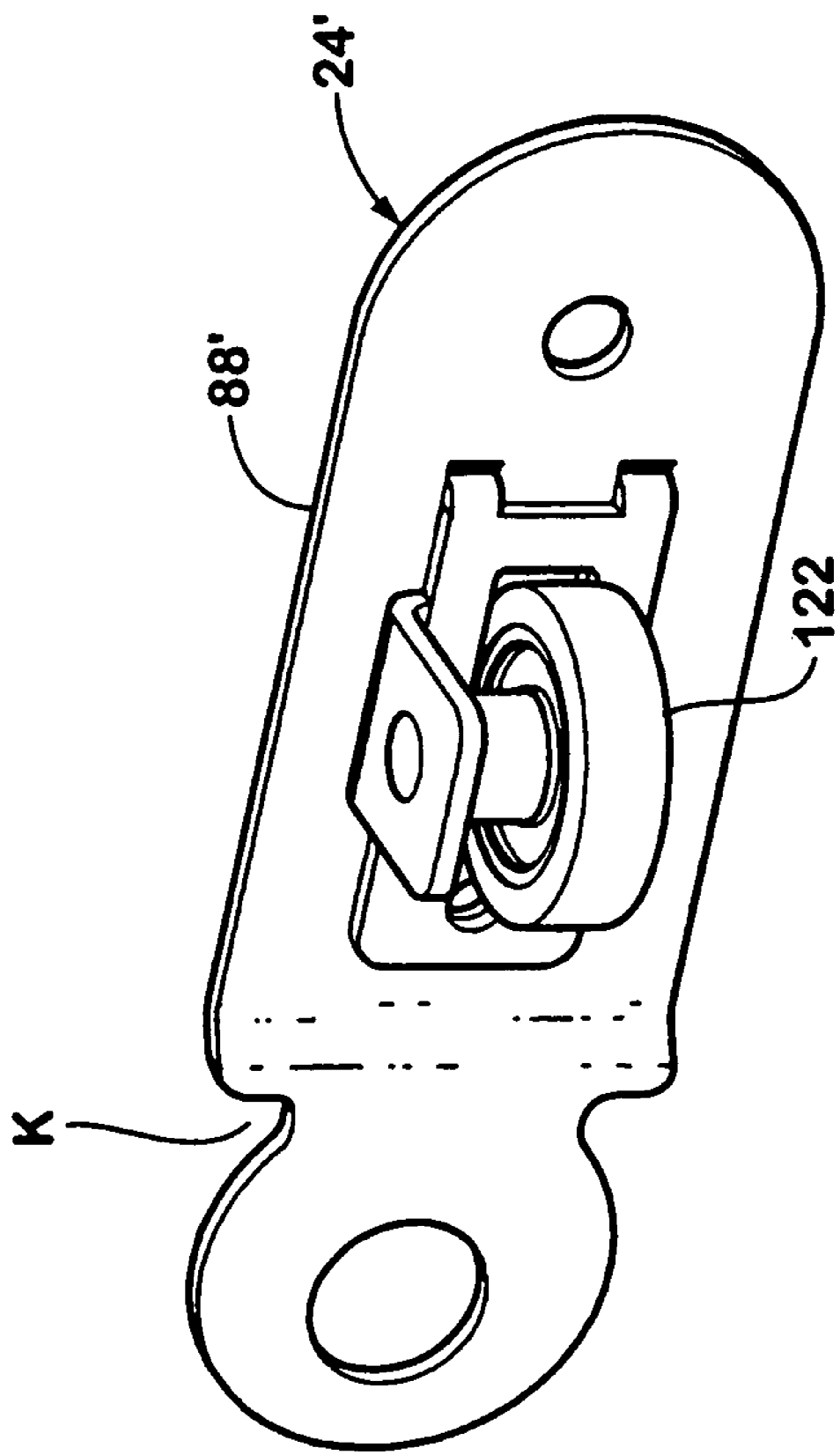
FIG. 8 is the same view as FIG. 7 of an alternative embodiment.

Wheel assembly 24 additionally includes a plate 88 between adjacent slats 20. Plates 88 are affixed with a fastener 89 engaging another circular channel 54 in slat 20 and the shaft-supporting wheel 112. In addition, an extension 90 of plate 88 pivotally joins a portion of the adjacent slat, such as the shaft-supporting wheel 112, thereby joining the adjacent slat and providing pivotal movement between the slats. Slats 20 are coupled to wheel assembly 24 at each end of the slat. As shown in FIG. 8, plate 88 has an offset bridge portion 90. Plate 88 is generally parallel to bridge portion 90 in separate planes. An end 92 of plate 88 has a convex front surface 94, which has approximately the same configuration as convex front wall 38 of slat 20. The height of plate 88, as defined between bottom edge 96 and top edge 98, is substantially equal to the height of slat 20 as defined between lower wall 36 and upper wall 34. Plate 88 includes a pair of through-holes 100, 102, placed in spaced relation, while bridge portion 90 includes an enlarged through-hole 104 formed with an annular flange 106.

A collar 108, having a reduced width portion 110, is placed through through-hole 104. Collar 108 is placed in registry with through-hole 102 of plate 88 of the immediately preceding bridge portion 90 in the direction of travel of conveying surface 11. Wheel 112 is attached to reduced width portion 110 of collar 108, and an axle (not shown) is placed through wheel 112, through-hole 104, collar 108, through-hole 102 of plate 88 of the immediately preceding end member 24, and circular channel 52 of slats 20, and, hence, couples adjacent slats 20 to each other. Wheel 112 rotates about a substantially horizontal axis lateral of the conveying surface. The purpose of first wheel 112 is to support web 12 and allow the web to travel along the support track network.

A generally L-shaped member 114 is formed having an aperture 116 formed in vertical section 119 in registry with through-hole 100 of plate 88 and circular channel 54 of slat 20. A horizontal section 118 of L-shaped member 114 includes a pin 120 projecting from a bottom surface 118', to which a second wheel 122 is rotatably attached. A suitable fastener 89 is threaded through aperture 116 of L-shaped member 114, through-hole 100 of plate 88 and circular channel 54 of slats 20 to provide a second coupling site for each end member 24. When assembled, wheel 122 is positioned below lower wall 36 of slat 20. The purpose of wheel 122 is to maintain the lateral orientation of slats 20 as the same travel longitudinally over the track assembly. Although wheel assembly 24 is illustrated having a second wheel 122 associated with each slat, it will be recognized that this is not critical, and that a second wheel 122 may be attached to every other, third, or fourth slat or more without departing from the spirit and scope of the invention.

In an alternative embodiment, wheel assembly 24' includes a second wheel 122 positioned at a lateral height of plate 88'. Plate 88' may be notched at K, the interface between adjacent slats, to reduce the likelihood of a diverted article from contacting plate 88'. Otherwise, wheel assembly 24' is generally the same as wheel assembly 24.

Figure 9:
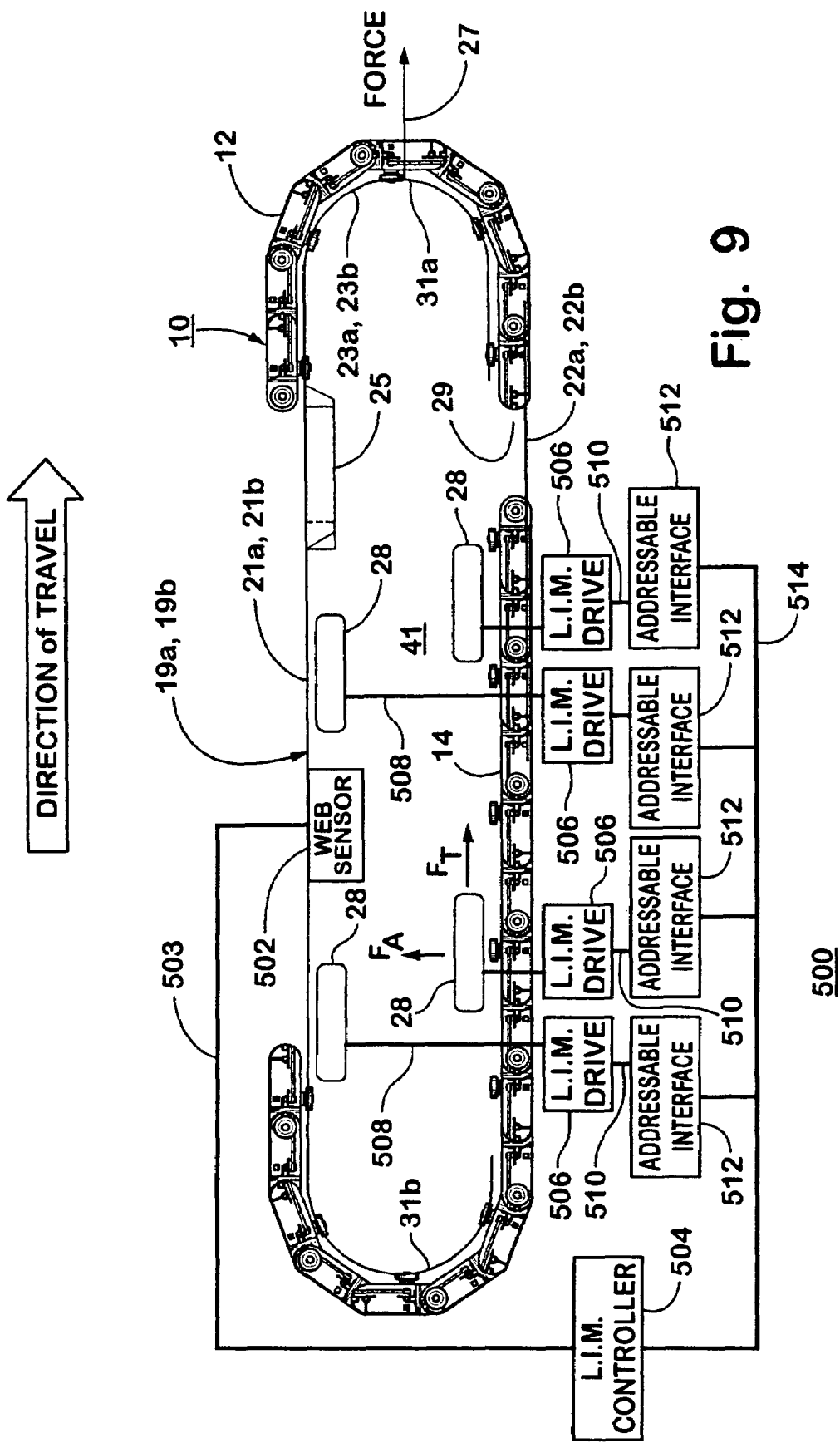
FIG. 9 is a combined mechanical and electrical schematic diagram illustrating a sorter assembly propulsion system in side elevation.
Figure 10B:
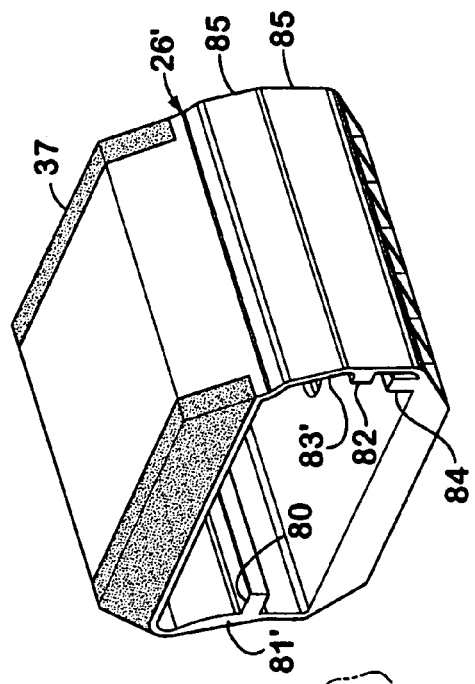
FIG. 10b is the same view as FIG. 10a of an alternative embodiment.
Figure 12:
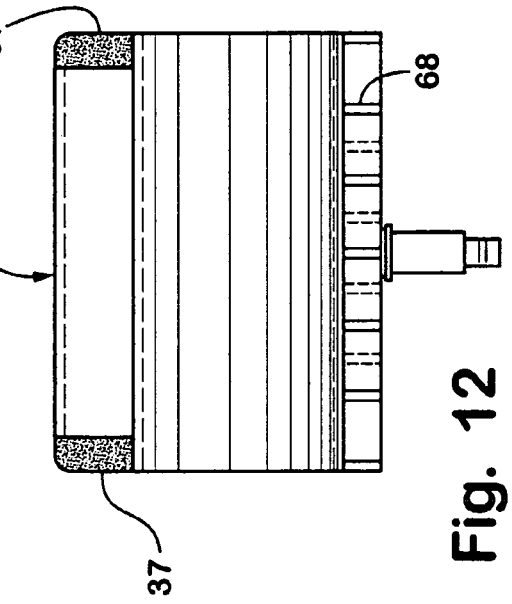
FIG. 12 is a front elevation of the pusher shoe in FIG. 10.
Figure 10A:
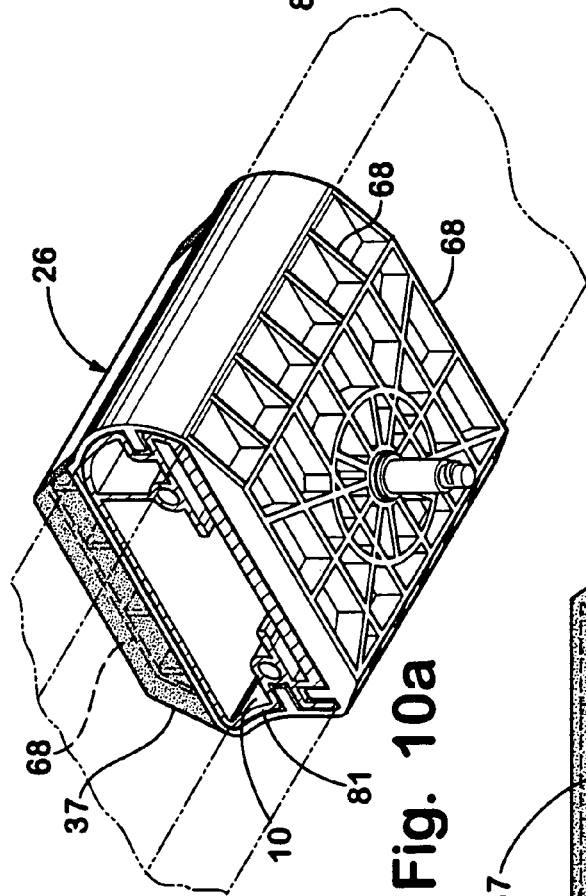
FIG. 10a is a perspective view of a pusher shoe in a slat.
Figure 11:
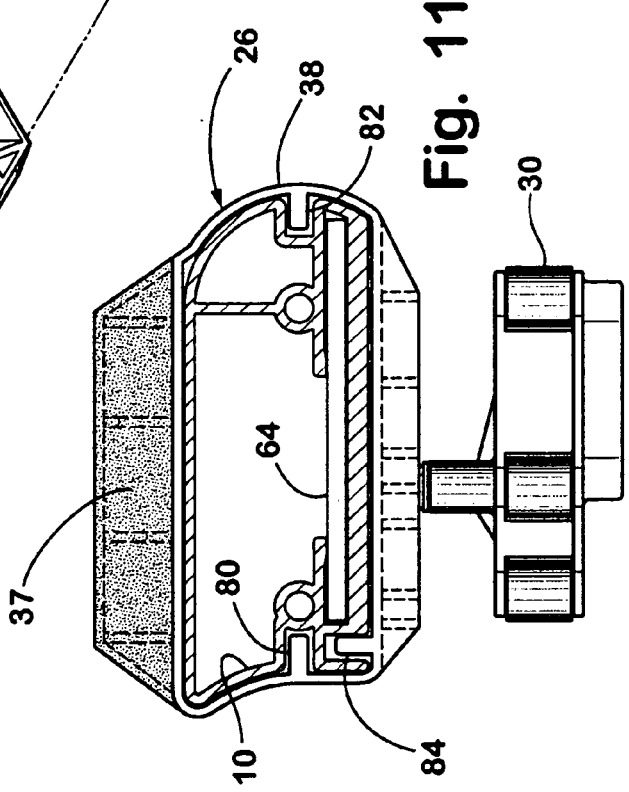
FIG. 11 is a side elevation of the shoe and slat combination in FIG. 10.

Each support track 19a, 19b includes a fixed portion 21a, 21b, and a moveable portion 23a, 23b (FIG. 9). An expansion joint 25 accommodates movement between moveable member 23a, 23b and fixed portion 21a, 21b. Expansion joint 25 includes a series of interlaced longitudinal fingers that provide a continuous track for wheels 112 notwithstanding the position of moveable member 23a, 23b. A force-producing device 27 applies an outward, generally horizontal, force on moveable member 23a, 23b, thereby maintaining a consistent tension to web 12 irrespective of expansion and contraction of the web, such as due to temperature variations, and the like. Force-producing device 27 may produce a consistent force irrespective of the position of moveable member 23a, 23b, as will be explained in more detail below. Endless web 12 has a bottom run 14, which is supported by a bottom portion 22a, 22b of fixed portion 21a, 21b of the support track network. Transitions 29 between bottom portions 22a, 22b and transition portions 31a, 31b of support track 19a, 19b allow endless web 12 to move between the inner surface of the bottom portions 22a, 22b and the outer surface of the remaining portion of support tracks 19a, 19b. This allows endless web 12 to be supported from below at both top run 13 and bottom run 14. Transition portion 29 is expandable in unison with movement of moveable members 23a, 23b, but is not a joint, per se. Transition portions 15 of web 12 are tensioned around the transition portions 31a, 31b of support tracks 19a, 19b.

Pusher shoe, or diverter shoe, 26 is a wraparound shoe (FIGS. 10–14), generally of the type disclosed in commonly assigned U.S. Pat. No. 5,127,510, the disclosure of which is hereby incorporated herein by reference. Pusher shoe 26 preferably includes a generally concave trailing sidewall 81 and a generally convex leading sidewall 83. As with front surface 33c and rear surface 33d of slats 20, convex leading side wall 83 and concave trailing side wall 81 may be arcuate or may be formed of a series of surface segments, such as planar segments, and may be asymmetrical relative to respective vertical midpoints or, alternatively, may be symmetrical. Pusher shoe 26 includes inwardly extending projections 80, 82, which project inward from trailing sidewall 81 and leading sidewall 83, respectively, and act upon respective channels 44, 46 in the associated slat 20 to provide bearing means for resisting rotational forces about the long axis of the corresponding slat 20 and about an axis parallel to the direction of travel of the corresponding slat 20, as disclosed in the commonly assigned '510 patent. An inward projection 84 of pusher shoe 26 gliding in a channel 48 of slat 20 provides a lateral stabilizer to resist rotational motion of shoe 26 about a vertical axis, as disclosed in the commonly assigned '510 patent. Alternatively, a projection of the slat could glide in a channel of the shoe to provide a lateral stabilizer.

Shoe 26 may be a one-piece shoe molded from a plastic material, such as nylon, Delrin, acetal copolymer, or other known durable plastic moldable material and is made up of a series of wall segments having a substantially uniform thickness as disclosed in the commonly assigned '510 patent. Although the pusher shoe 26 is illustrated as a one-piece shoe, it could also be made in separate glide portions and diverter portions, as disclosed in the '510 patent. Pusher shoe 26 may be made from a self-lubricating plastic material or may include lubricating strips (not shown) between inward projections 80, 82 and/or 84 and respective channels 44, 46 and 48. The lubricating strips may be strips that fit over the respective inward projection or, otherwise, are retained in functional relationship thereto. Pusher shoe 26 includes means defining one or more diverting surfaces 37, such as by a high-friction insert, or the like, as disclosed in the '510 patent. In an alternative embodiment, pusher shoe 26 may have the configuration of the pusher shoe disclosed in U.S. Pat. No. 5,127,510, but with the lateral stabilizer modified to accommodate positioning of the secondary within the slat. Alternatively, pusher shoe 26 may have the configuration disclosed in European Patent EP 0 602 694, the disclosure of which is hereby incorporated herein by reference.

In an alternative embodiment, pusher shoe 26' includes a concave trailing side wall 81' and a convex leading side wall 83' that may either or both have non-arcuate planar portions 85 (FIG. 10b), but would, otherwise, be generally the same as pusher shoe 26.

Pusher shoe 26 may include a transfer assembly 30 of the type disclosed in commonly assigned patent application Ser. No. 09/840,639, filed Apr. 23, 2001, by Veit et al. for a SORTATION SYSTEM DIVERTER SWITCH, the disclosure of which is hereby incorporated herein by reference, extending downwardly from the pusher shoe. Transfer assembly 30 is an elongated member utilized to divert the pusher shoe to a guide rail and to guide the pusher shoe along a guide rail of a diverter assembly 16 in order to divert packages. Diverter assembly 16 may be of the type disclosed in commonly assigned patent application Ser. No. 09/606, 610, filed Jun. 29, 2000, by James T. Shearer, Jr. et al., for a CONVEYOR SYSTEM WITH DIVERTING TRACK NETWORK, the disclosure of which is hereby incorporated herein by reference. Because transfer assembly 30 is elongated in the direction of movement of endless web 12 and protrudes downwardly from pusher shoes 26, care must be taken to avoid contact between associated transfer assemblies 30 as the corresponding slats 20 move at transition portions 15 along transition portions 31*a*, 31*b* of support track network 19. As would be apparent to those skilled in the art, the reorienting of the slats at transition portions 15 moves transfer assemblies 30 of adjacent pusher shoes 26 closer together. This is a function of the distance, or lever arm, between transfer assemblies 30 and the pivot of the associated slats 20, which, in the illustrated embodiment, is at mounting member 52. Advantageously, slat 20 has mounting member 52 positioned closer to lower wall 36 than to upper wall 34. Because mounting members position the axis of rotation of wheels 112, this reduces the distance between transfer assembly 30, which extends from a bottom portion of the shoe, and the pivot point for each slat. This, in turn, reduces the amount of pivotal movement of each transfer assembly 30 toward the adjacent transfer assembly 30 for a given radius of transition portion 31. By providing mounting portion 52 closer to lower wall 36 than to upper wall 34, it is possible to decrease the radius of transition portion 15. This decrease in radius allows the top run of endless web 12 to be closer to the bottom run 14 of endless web 12. This, in turn, reduces the overall height of sorter assembly 10. As is understood by those skilled in the art, it may be desirable to reduce the vertical height of the sortation assembly in some applications. Indeed, sortation assembly 10 may be applied in locations, which would, otherwise, require trenching the floor at the location of the sortation assembly to accommodate a vertically higher sorter assembly than that provided herein.

As an enhancement to facilitate a further reduction in sorter assembly height, the transfer assemblies 30 could be oriented on a diagonal prior to entering a transition portion of the web 15 from top run 13 (FIG. 36*a*). This allows the radius of the rails to be further reduced without interference between adjacent transfer assemblies. This may be accomplished by an orienting device 300, such as by a magnet that is suitably positioned to attract a portion of the transfer assembly. Transfer assemblies 30 can be reoriented in a linear aligned fashion coming out of the transition portion 15 to bottom run 14 by a reorientation device 302. A similar orientation and reorientation of the transfer assemblies can occur between bottom run 14, transition portion 15 and top run 13.

Figure 26A:
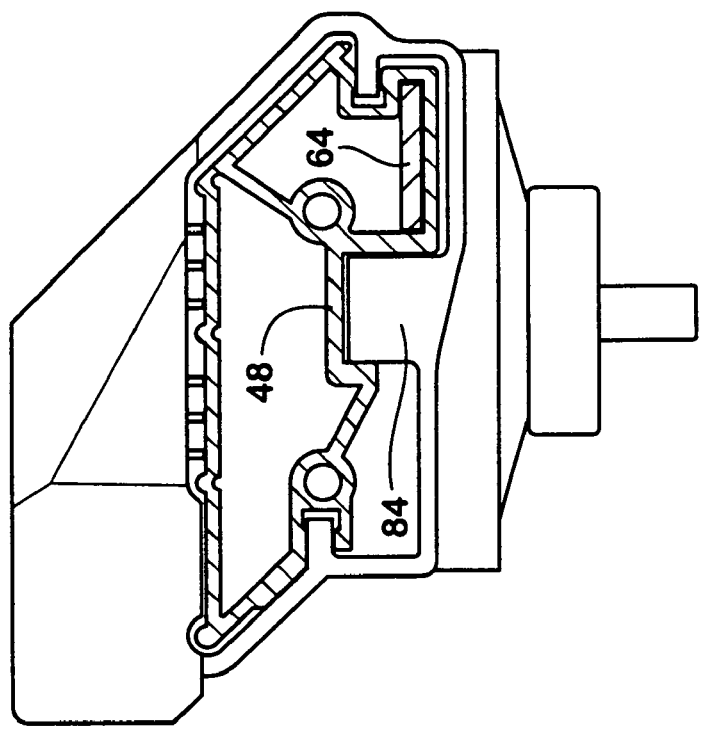

Sorter assembly 10 has a propulsion system 41, which, in the illustrative embodiment, is a linear motor propulsion system. Linear motor propulsion system 41 includes one or more linear motor primaries 28 and a plurality of linear motor secondaries 63 at the slats. At the slat means, the adjacent or part of wall 34, 36, 38, 40 is either inside or outside of the slat. In one embodiment, linear motor secondaries include magnet plates 64 within interior 42 of some or all of the slats 20 in combination with lower wall 36 of the slat (FIG. 2). Magnet plates 64 are positioned in a portion of interior 42 closest to primary 28. Primary 28 is closely spaced from slat 20 defining a slat gap SG between a face of primary 28 and a corresponding face of slat 20 and a magnetic gap MG between a face of primary 28 and magnet plate 64 (FIG. 3). As a secondary 63 passes a primary 28, a magnetic interface MI exists at the projection of magnet plate 64 on primary 28, or vice versa. In order to minimize magnetic gap MG, lateral stabilizers made up of inward projection 84 and channel 48 may be outside of magnetic interface MI. In the embodiment illustrated in FIG. 2, the lateral stabilizer is adjacent rear wall 40. In an alternative embodiment illustrated in FIG. 3, slat 20*a* has a lateral stabilizer that is adjacent front wall 38. Other positions may suggest themselves to the skilled artisan. In another alternative embodiment illustrated in FIG. 26*a*, a pusher shoe and slat, each of conventional configurations, are further provided with a magnet plate 64*a* in the slat. The lateral stabilizer could be positioned between the front and back of the shoe with the linear motor magnet plate 64 forward or rearward of the lateral stabilizer, as illustrated in FIG. 26*a*. The lateral stabilizer could also be put on upper wall 34. Indeed, magnet plate 64 could be divided into two magnet plates with the lateral stabilizer between the two magnet plates. Alternatively, the shoe and slat disclosed in U.S. Pat. No. 5,127,510 may be provided with a magnet plate located within the base of the outwardly projecting protrusion of the slat, which makes up part of the lateral stabilizer. In such an alternative, the front-to-back dimension of the base 304 of the lateral stabilizer protrusion may be increased to accommodate the secondary 64, as shown in FIG. 26*b*. Preferably, the lateral stabilizer would be substantially outside of the magnetic interface MI.

Figure 25:
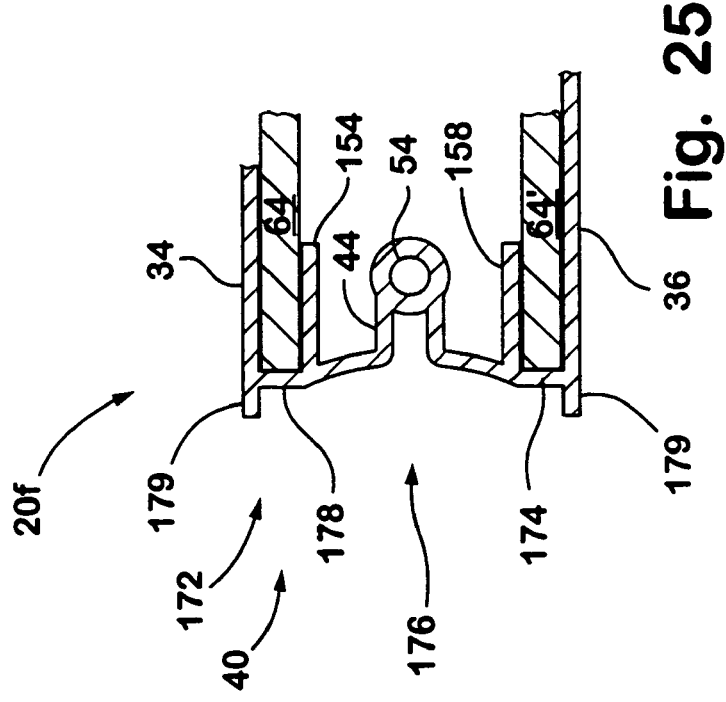
FIG. 25 is the same view as FIG. 2 of an alternative embodiment thereof.
Figure 27:
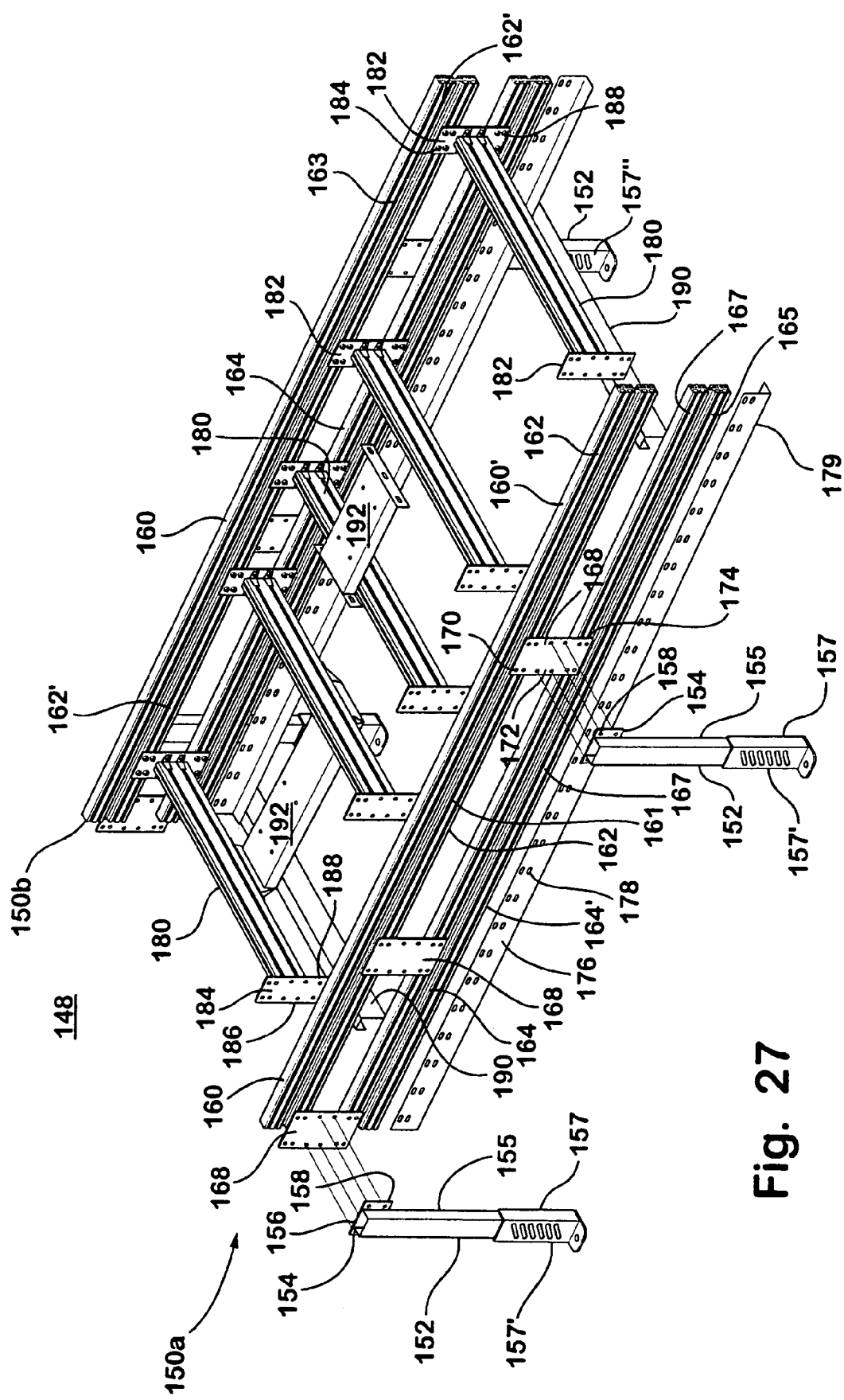
FIG. 27 is an exploded perspective view of a frame assembly.

Magnet plate 64 is positioned in a receiving section 62 of slat 20. Magnet plate 64 is fixed from within the corresponding slat. This avoids the need for fasteners, which must be separately applied through the slat into engagement with an opening in the magnet plate after the magnet plate has been positioned therein. One way to fix the magnet plate from within the slate is to provide receiving section 62 with one or more detents, illustrated as 65 and 66, which fix magnet plate 64 from within the slat. The relative dimensions of magnet plate 64 and slat 20 provide an interference fit between magnet plate 64 and detents 65 and 66. However, other techniques may be used to fix magnet plate 64 from within slat 20, such as by deforming a portion of a wall 34, 36, 38 or 40 toward the magnet plate, as illustrated in FIG. 25, or by using inserts, such as plastic inserts, or the like, in order to interlock the secondary with the slat. This is especially useful to accommodate variations in dimensions of the slat and may be deformable to match the particular slat and magnet plate interface. Alternatively, magnet plate 64 may be adhered in place, such as by welding, adhesive, or the like.

Linear motor primaries 28 may be, advantageously, positioned within endless web 12 (FIG. 9). Linear motor primaries 28 may be adjacent top run 13 of the endless web and drive slats 20 from beneath. Primaries 28 may be above bottom run 14 and drive slats 20 from above. Separate primaries 28 may be adjacent both top run 13 and bottom run 14. Linear motor primaries 28 adjacent top run 13 may be positioned where the diverter assemblies 16 are not positioned, such as between diverter assemblies 16 (FIG. 15). This allows the linear motor primaries to be immediately adjacent endless web 12 without interfering with the diverting of pusher shoes 26. While the primaries 28 are shown on the lateral centerline of the web, it should be understood that they may be offset from the lateral centerline and may be staggered. Also, more than one primary may be provided side-by-side, such as to drive move than one secondary for each slat.

Support track network 19 supports bottom run 14 from below. Therefore, the weight of the bottom run 14 holds the bottom run against the support track network. Linear motor primaries 28 driving slats in bottom run 14 provide a thrust, or propulsion, force FT tending to propel web 12 and attraction force FA tending to attract the motor magnet plates, and, hence, the slats toward the linear motor primaries. Secondaries 63 are designed in a manner, and linear motor primaries 28 adjacent bottom run 14 are controlled in a manner, to limit force FA to a level that will not substantially elevate bottom run 14 off support track network 19. This substantially reduces any noise from slats 20 being raised by force FA and then dropped against support track network 19 when the slat moves beyond the primary.

Sortation assembly 10 includes a propulsion control system 500. Propulsion control system 500 in combination with propulsion system 41 provides a closed-loop propulsion system for endless web 12. Propulsion control system 500 includes a web sensor 502, which supplies an output 503 to a linear motor controller 504. Propulsion control system 500 additionally includes linear motor drives 506, each of which supplies a high current at an output 508, which supplies current to the respective linear motor primary 28. Linear motor drives 506 are conventional motor controllers, such as variable frequency drives, which are capable of energizing the respective linear motor primary 28. Such linear motor drives are commercially available from various sources, such as Siemens A. G., Mitsubishi, Ltd., and the like. Each linear motor drive receives an input 510, which establishes the output of linear motor drive 506 and thereby the nature of the excitation current applied to the linear motor primary at output 508. Conventionally, input 510 is a variable signal, such as an analog voltage, that may vary from between 0 and 5 volts or between 0 and 10 volts, or the like. The magnitude of the analog voltage controls the frequency of the output of linear motor drive 506 such that the greater the magnitude of the input voltage at 510, the higher the frequency of the output at 508 of the corresponding linear motor drive 506. Input 510 is established by an addressable interface 512. Interfaces 512 are individually addressable by linear motor controller 504 over a digital interface 514. Digital interface 514 allows linear motor controller 504 to individually address each interface 512 in order to set the input 510 for the associated linear motor drive. Digital interface 514 may be a conventional bus, such as a CAN, LAN, Ethernet, or other known conventional or custom bus system.

Web sensor 502 senses the passing of each slat 20 and thereby provides information over output 503 to linear motor controller 504 relevant to the speed of web 12. In order to accomplish this sensing, web sensor 502 may be a proximity sensor, such as an inductive proximity sensor, an optical sensor, an ultrasonic sensor, a microwave sensor, or the like. Web sensor 502 senses the gap, or transition, between slats, but may, otherwise, sense the movement of the slats, such as by direct contact with the slats, or the like. Web sensor 502 may also have the capability of identifying individual slats. For example, web sensor 502 may include a magnetic sensor, such as a Hall-effect sensor 572, which senses one or more magnets in one or more slats 20. This provides a confirmation to controller 504 that the slat speed sensor 560 is operating properly by having a confirmation that the slat that should be passing over at a particular time, such as a slat designated the lead slat, corresponds to that determined by the integration of the speed of web 12.

Linear motor controller 504 sends out digital signals on digital interface 514 to each addressable interface 512 in order to establish the output thereof and thereby the speed of the corresponding linear motor drive. This arrangement allows the ability of linear motor controller 504 to control the output of linear motor drive 506. In certain applications, sortation assembly 10 may be at a great length, measuring hundreds of feet, creating an advantage of utilizing a linear motor propulsion system. This conversion of the digital command to an analog signal at each linear motor controller, reduces the necessity for conventional conditioning of the analog input to the linear motor drives 506 that are spaced distantly from linear motor controller 504. Moreover, propulsion control system 500 allows each linear motor drive 506 to be individually controlled. For example, under acceleration or heavy load conditions, linear motor controller 504 may energize all or most linear motor drives 506 in order to provide sufficient propulsion to web 12. Under other conditions, such as lightly loaded conditions or during steady-state operation, linear motor controller 504 may cause one or more addressable interfaces 512 to instruct the associated linear motor drive 506 to supply an output 508 to the associated linear motor primary 28 corresponding to a reduced, or no, thrust. Other examples of the use of propulsion control system 500 to individually control linear motor drives 506 would suggest themselves to the skilled artisan and are all intended to be covered herein.

Figure 16:
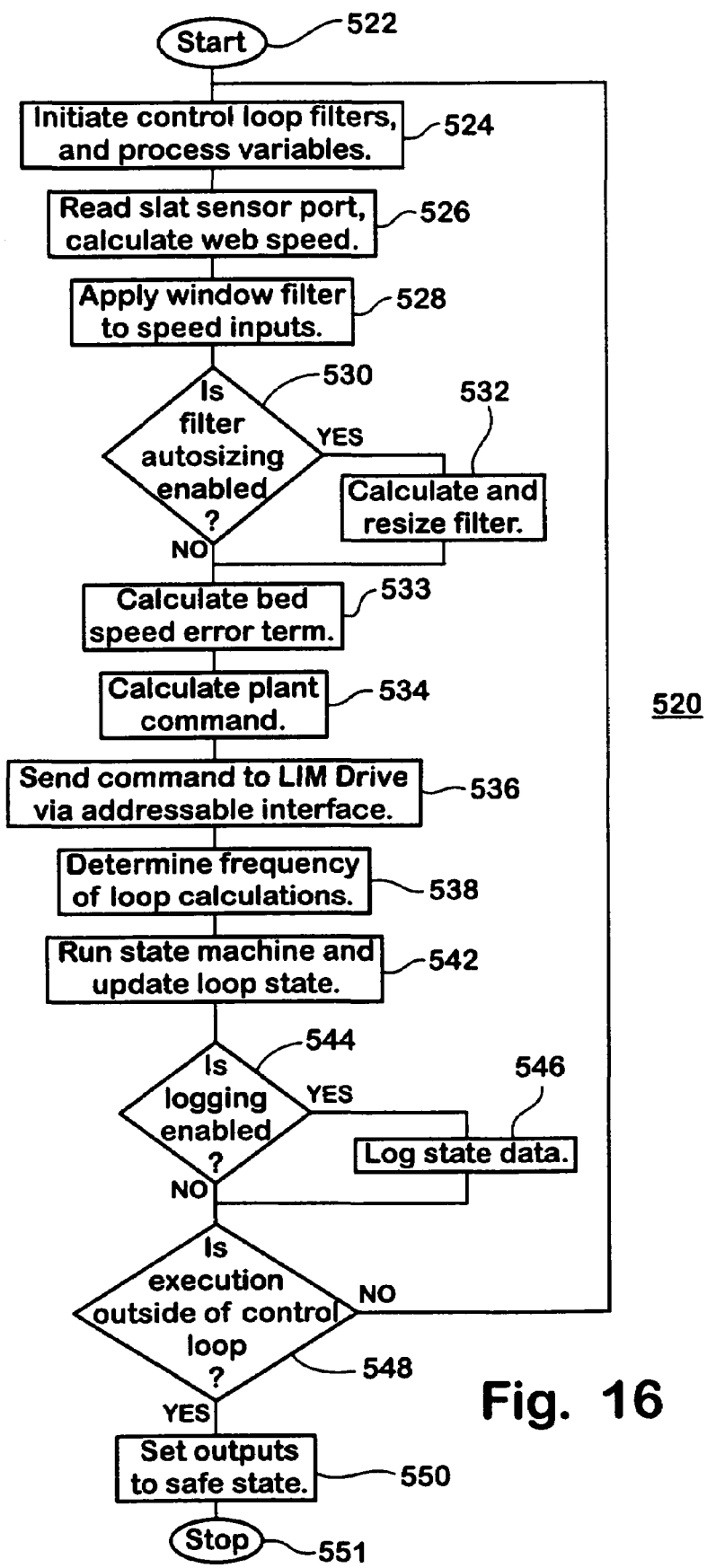
FIG. 16 is a flowchart of a control program.

Propulsion control system 500 includes a control program 520 (FIG. 16). Control program 520, in the illustrated embodiment, is carried out by linear motor controller 504 which is microcomputer-based. Control program 520 begins at 522 and initializes at 524 a control loop filter. The control loop filter, which includes speed filters, and the like, is provided in order to limit response to rapid fluctuations in the output of web sensor 502. The control then calculates at 526 the speed of bed 12, such as by reading outputs 503, and applies a window filter to the speed inputs at 528. The window filter is in order to keep the PID portion of the control loop from reacting inappropriately to sudden changes in web speed reported by the web sensor. For example, the window filter reduces the tendency of the PID portion of the control from over-responding to changes in web speed. This may be accomplished by averaging a certain number of the previous values in a window in order to filter the commands.

It is determined at 530 whether a filter auto-sizing is enabled. If so, the filter is resized at 532. The filter is sized to give responsiveness to the loop. If the sample rate changes, such as a result of system loading, the sample rate will be changed to maintain the time constant of the filter. The filter may be resized to keep the delays in the closed-loop control at a minimum and predictable. This is because a reduction in the responsiveness of the speed control reduces the ability of the control to keep the speed of the web within a narrow tolerance. A bed speed error is calculated at 533 and a plant command is then calculated at 534. The plant command is the voltage that is to be produced at 510 to select a particular output of linear motor drive 506 in order to effect the change in the thrust that is desired. This may also include a scaling factor, if required, in order to adapt to the particular parameters of the linear motor drive 506 being utilized. Controller 504 then sends a command at 536 over digital interface 514 to individual addressable interfaces 512.

Control program 520 determines at 538 how fast the loop is processing in order to ensure that the loop is progressing properly and repeatably. If a speed control loop is being delayed and/or slowed, control program 520 could notify an upper level of control (not shown). Control 520 then determines whether a state machine 540 needs to be updated at

542. It is then determined at 544 whether a logging function is enabled. If the logging function is enabled, data, such as bed speed, bed speed error, plant command in hertz, or the like, is logged at 546. This logging function allows the system to monitor how the sorter responds to change, such as in loading or in speed variation. It also allows the control to accumulate historical data to detect errors in portions of the sorter assemblies, such as wheel bearings producing excessive drag, or the like. The control then determines at 548 whether the execution of the control loop falls outside of control loop parameters. If so, the outputs of the addressable interface 512 are set to a "safe" state at 550 combined with a notification to an operator of a failure condition. The "safe" state may be a zero speed condition or it may be a reduced speed condition. If it is determined at 558 that the execution is not outside of the control loop, control returns to 226 where the slat sensor is, again, accessed and the control loop executes once more.

Figure 17:
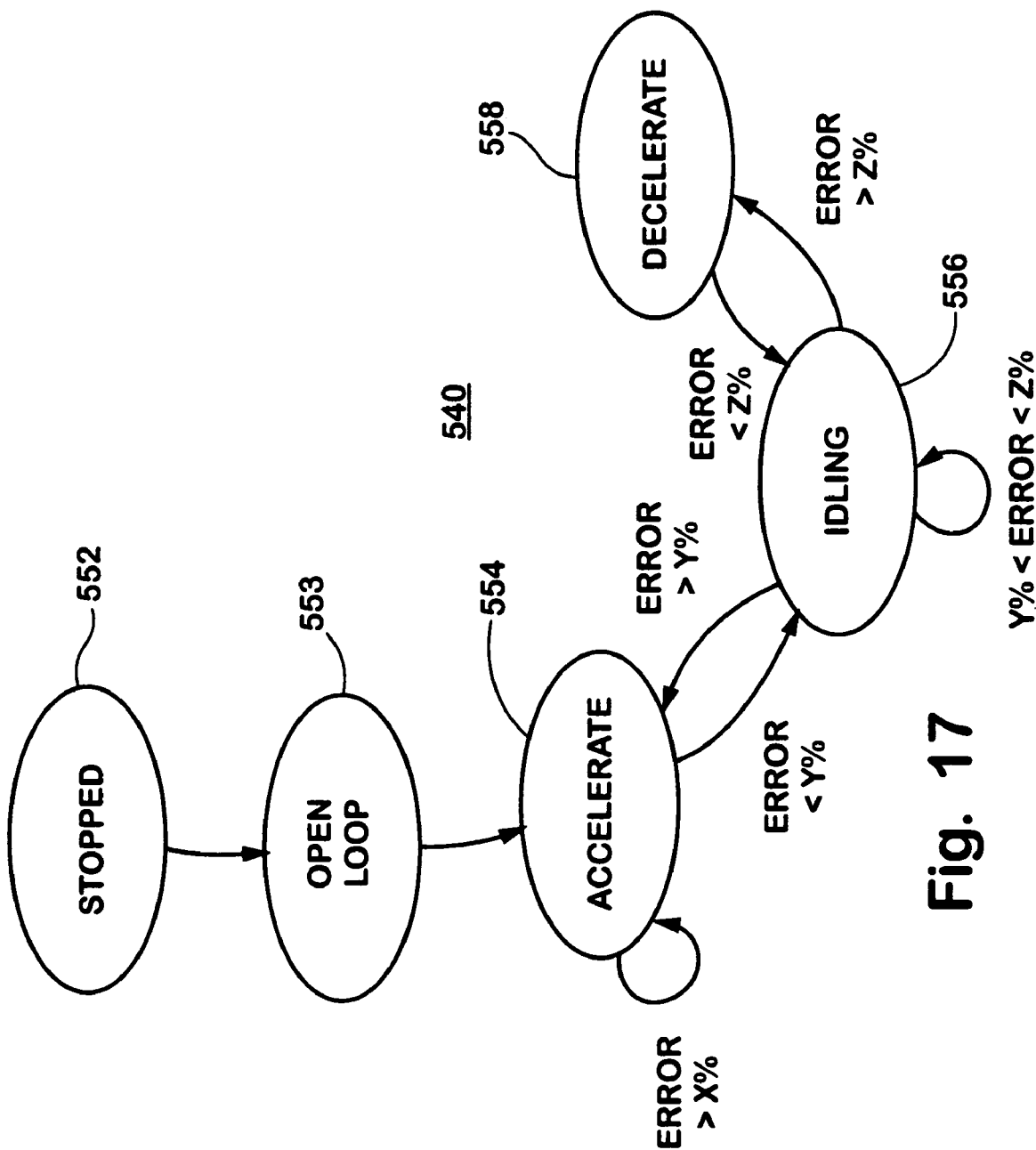
FIG. 17 is a state diagram for the control program in FIG. 16.

State machine 540 determines the state of the control loop and establishes parameter limits of closed-loop control depending upon its state (FIG. 17). State machine 540 includes a stopped state 552, a bed acceleration state 554 during which the linear motor propulsion system is accelerating the bed, an idling state 556 during which no adjustment is being made to the speed of the bed, and a deceleration state 558 during which the linear motor propulsion control is decelerating the bed. For each state 552–558, a determination is made whether the speed error is within an acceptable range and, if not, the control moves to a different state in order to effect the appropriate function.

Figure 18:
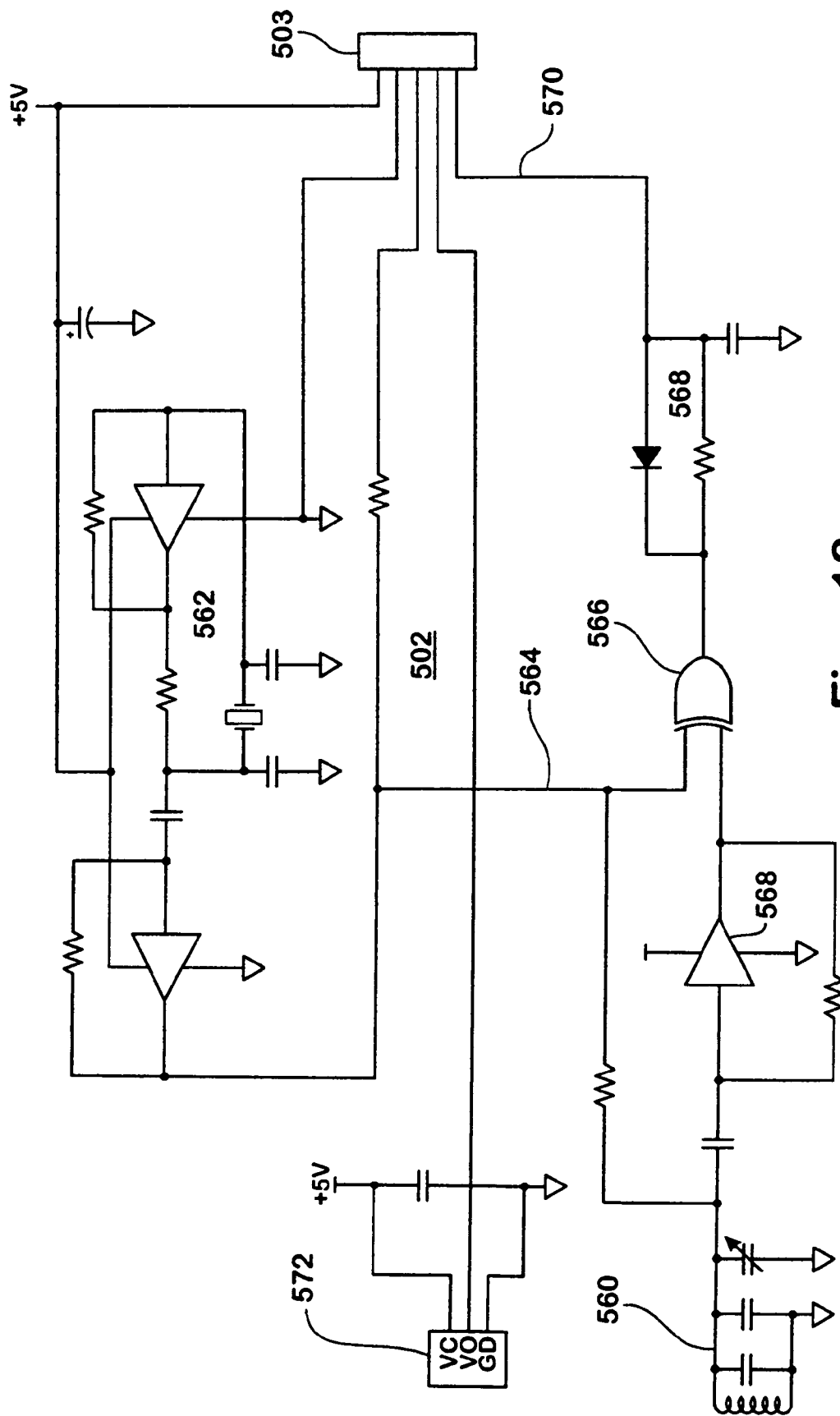
FIG. 18 is an electronic schematic diagram of a web sensor.

Web sensor 502 includes a proximity sensor 560 in the form of a tuned LC circuit, which is supplied with an oscillating square wave by an oscillator 562 at an oscillator line 564 (FIG. 18). Oscillator line 564 is connected with an external input 503, should it be desired to supply the oscillating signal from an external source, such as controller 504. If so, the components making up oscillator 562 would be excluded from the circuit. Oscillator line 564 is supplied to proximity sensor 560 and to an EXCLUSIVE OR circuit 566. The output of proximity sensor 560 is supplied through an amplifier 568 to the other input of EXCLUSIVE OR circuit 566 whose output is integrated by an integrator 568. The output of integrator 568 is supplied at 570 as a slat detection signal. Proximity sensor 560 operates by changing its resonant frequency in the presence or absence of the metal surface of each slat, which causes a phase shift between the inputs to EXCLUSIVE OR 566. The phase shift results in a variation in the output, which is integrated by integrator 568, and thereby output 503 varies with the presence or absence of the gap between slats.

Web sensor 502 may additionally include a particular web identifier in the form of a magnetic sensor 572. Magnetic sensor 572 may be a Hall-effect sensor or other type of sensor, such as a reed switch, or the like, that senses a magnetic field. Magnetic sensor 572 detects one or more permanent magnets, either the North Pole, South Pole, or both North and South Poles. Such magnet, or magnets, may be positioned in one slat, designated an index slat or in more than one slat, in which case the magnets may be arranged in a unique arrangement in each of the slats in a coded fashion. The output of magnetic sensor 572 is supplied as an output at 503. Alternatively, the web identifier could be optical, recognizing reflective strips on the slats, or some other sensing system.

As previously set forth, web sensor 502 supplies a signal that varies as the speed of web 12 to linear motor controller 504 moves along with an identification of one or more index slats. In return, linear motor controller 504 supplies digital signals, which are separate inputs to addressable interface 512 in order to control the respective linear motor drive 506. A control program 520 run by controller 504, or other computer, operates a closed-loop control algorithm in order to maintain a closely regulated speed of web 12. In the illustrative embodiment, web 12 is regulated at a nominal speed with a variation of plus or minus 2.5 percent or less. A state machine 540 is used to monitor the state of the linear motor propulsion control system and to ensure that adequate control is made over the speed of the web by assigning errors for each of different states. Propulsion control system 500 controls the linear motor controllers 504 in a manner which operates the linear motor primaries as close to its desired speed without exceeding the attractive force on the slats.

Figure 19:
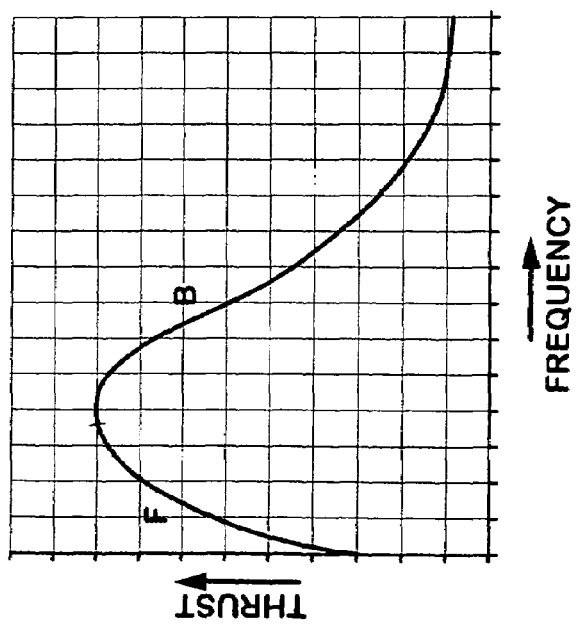
FIG. 19 is a diagram of a linear motor excitation.

As is conventional, and as is understood by those skilled in the art, the output of a variable frequency linear motor drive 506 varies, such as between 0 hertz and maximum frequency, such as 120 hertz, and obtains a thrust output with the corresponding linear motor primary 28 which varies as a function of the frequency output of the linear motor drive. As is also known in the art, the relationship between this frequency and the thrust is a somewhat bell curve, such that maximum thrust is produced at an intermediate value between the maximum and minimum (FIG. 19). In the illustrative embodiment, the control program 520 controls the output of linear motor drive 506 on one side or the other of the maximum thrust value of the frequency curve. Conventionally, the front side of the curve F, between 0 hertz and the maximum thrust, is used. However, it is contemplated that the control program may operate on the backside B of the thrust verses hertz curve, namely for frequency values beyond those at which maximum thrust is obtained and higher frequencies above that value. When operating on this back side B of the curve, it is possible to obtain even higher thrust values FT for lower amounts of attraction force FA between the linear motor primary 28 and the slats, thereby reducing the tendency of the motors to lift the slats in lower run 14 off of the support track network 19.

Control program 520 includes a target speed and compares motion of the slats to compute an error term and uses approximations to generate a signal that runs the linear motor drive. The control loop is a digital proportional integral derivative (PID) controller, but other closed-loop control techniques may be utilized, such as analog control loops, and the like. Because of the requirement for ever-smaller gaps, it is desirable to minimize variation from one conveyor surface to another, such as from an induct, or feed conveyor, to the sortation assembly. Any speed variation may increase or compress gaps between articles. Speed variation may occur, for example, when the conveyor has a full-packaged load and abruptly discharges many packages, then the abrupt changed load could lead to speed changes. The present closed-loop propulsion control system avoids problems with conventional open-loop drives for sorter assemblies. The sorter assembly 10 may include an idle mode, wherein, if packages are not detected upstream of the sorter assembly, the speed of the sorter assembly may be decreased to a reduced speed, such as, for example, to one-half of the speed, or the like. This may reduce wear and energy consumption, as well as avoiding the need to increase the speed back up to full-operating speed, when articles are, again, supplied to the sorter.

It is further determined that design parameters also may be selected in a manner which minimizes attractive force while maximizing forward thrust. In the illustrative embodiment, for a sortation bed of between approximately 1.2 meters to approximately 1.6 meters wide, it has been determined that the following dimensions are useful in producing the desired thrust FT without exceeding the attractive force FA that would substantially lift slats in lower run 14 off their support rails:

Secondary width (laterally of conveying surface): approximately 160 mm to approximately 180 mm.

Secondary length (longitudinal of conveying surface): approximately 110 mm to approximately 120 mm.

Thickness: approximately 4 to approximately 6 mm.

Magnetic gap (MG): approximately 8 mm to approximately 9 mm.

Slat gap (SG): approximately 2 mm to approximately 3 mm.

In the illustrative embodiment, 7.5 to 8.5 amps are supplied to the linear motor primaries. As an example, motor primary spacing may be approximately every 8 meters of conveyor length. This would involve, by way of example, 20 to 25 linear primary motors for a 120-meter sorter. However, it should be understood that these design parameters might vary depending upon the load, speed and other parameters of the conveyor sorter assembly.

A cooling system 314 is provided for primaries 28. Cooling system 314 includes a heat sink 310 having a series of heat-dissipating fins 311 and a fan 312. Fins 311 are oriented generally laterally of conveying surface 312. Because primaries 28 are longitudinally elongated, fins 311 are elongated in the short dimension of the primaries. This provides reduced temperature gradients on the primaries. Fan 312 may be combined with a plenum 313 to direct airflow across fins 311. In this manner, fan 312 may be oriented in various directions, or may be multiple fans, and still direct the air over fins 311.

The linear motor propulsion system may be a non-synchronous type, wherein magnet plate 64 is made from a metallic material that conducts magnetism. Examples of such magnetically permeable materials include carbon steel, iron and other such known permeable materials. In the illustrated embodiment, magnet plate is made from cold-rolled steel. Alternatively, the linear motor propulsion system may be a synchronous system for which magnet plate 64 would be a permanent magnet, such as ferrite, aluminum-nickel-cobalt, or the like. For a synchronous system, the magnet plate would typically be mounted at the slat, but outside of the interior such that the aluminum wall of the slat is not part of the secondary. This could occur by making the magnet plate a part of the wall of the slat or by mounting the magnet plate, or plates, to an exterior surface of the slat. Applications for such synchronous propulsion systems, which enjoy an increase in motor efficiency over non-synchronous ones, are applications where the presence of a permanent magnet would not affect the nature of the articles being sorted or other metallic objects in the presence of the sorter assembly.

Of course, it may be desirable to create a sorter assembly having a combination synchronous and non-synchronous linear motor system. For example, primaries driving the top run of the web from below could be operated as synchronous linear motors by producing thrust in magnetic magnet plates outside of the slat interior, while primaries driving the bottom run of the web from above could be operated as non-synchronous linear motors by producing trust in magnetically permeable magnet plates in the slat interior. This would allow the motors driving the upper run to assert more thrust without the need to be concerned about attraction force, while the motors driving the lower run apply sufficient thrust to keep the slats in the lower run moving, but without asserting significant thrust on the web as a whole. An advantage of the present invention operated at least in part as a synchronous linear motor propulsion system, is that the magnet plate, which is magnetic, would be on the side of the slat opposite the conveying surface. This would significantly reduce the threat to goods being sorted, from the magnetic field of the magnet plates.

Figure 20A:
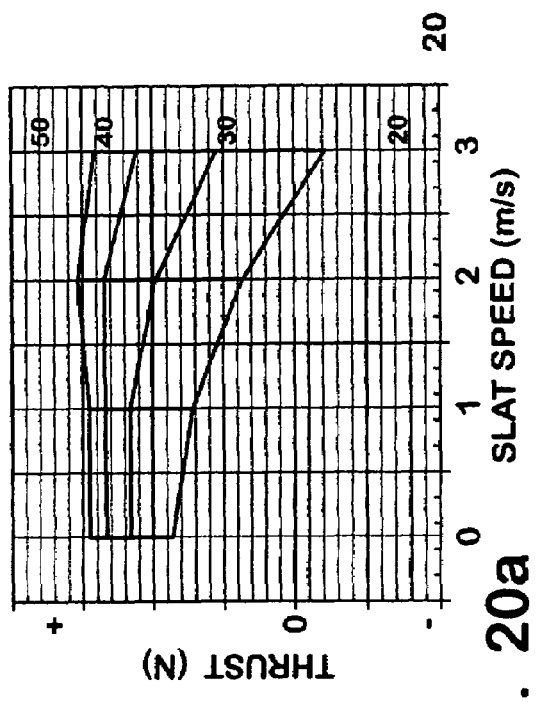
FIGS. 20a and 20b are diagrams of linear motor control parameters.
Figure 20B:
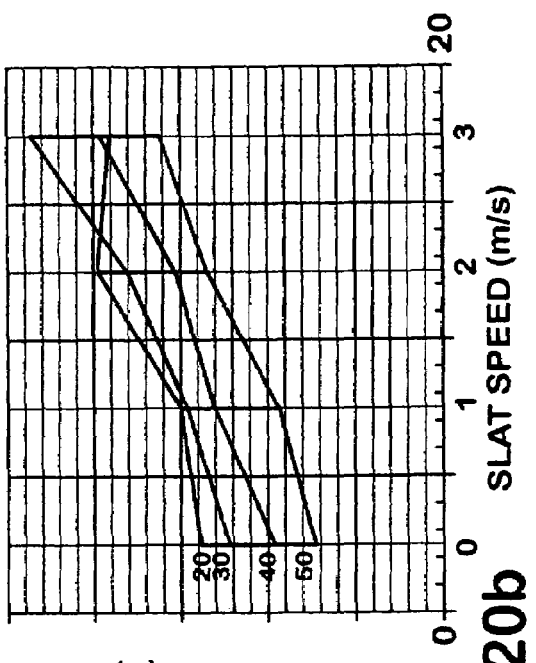

Control of the linear motor primaries in order to avoid lifting the slats in the bottom run may be seen by reference to FIGS. 20a and 20b. They illustrate the relationship between linear speed of each motor, slat speed and frequency applied to the linear motor primary. To prevent slats from lifting off slat supports in the bottom run, the motor speed minus slat speed (also known as slip) must be sufficiently high. Alternatively, for lower values of slip, the motor current must be sufficiently reduced, to avoid exceeding a particular attractive force. In other words, the linear speed of the motor has to be higher than the linear speed of the slat so that, at least on the bottom run, the linear motor cannot run close to synchronous speed. However, it may be undesirable to allow the slip to go too low. This may require, for example, that when decreasing web speed, the power not be decreased too quickly, or else slat chatter may occur.

In an alternative embodiment illustrated in FIG. 21, a slat 20c includes upper and lower magnet plates 64, 64' which are retained in position by horizontal extensions 154, 156, 158 and 160. Slat 20c is useful with a sorter assembly having linear motor primaries that are positioned to drive the endless web from both sides of the web, i.e., from both inside and outside of the web. Also, the front wall 38 and rear wall 40 define respective forward convex surface 33c and rear concave surface 33d that extend approximately equidistant from respective channels 44, 46 such that mounting portions 52 and 54 are generally equidistant between top and bottom walls 34, 36.

In another embodiment illustrated in FIG. 22, a slat 20d includes a magnet plate 64 in only an upper portion thereof. The magnet plate would be driven by a linear motor primary positioned outside of the endless web, such as from below the sorter assembly. Slat 20d includes a channel 44 having a generally T shape thereby combining channel 48 with channel 44. This allows the lateral stabilizer to be incorporated with the bearing means in a composite channel. In this manner, the lateral stabilizer is also outside of the magnetic interface that is defined between magnet plate 64 and the linear motor primary (not shown).

In another alternative embodiment illustrated in FIG. 23, a pusher shoe 26" is shown having a glide portion that is propelled along diverter assembly 16 by a pin 32 and bearing 30 mounted by a support portion 78. Detents 65 and 66 included in respective walls 56, 58 are shown retaining the respective magnet plates 64, 64' in their respective receiving sections 60, 62 of slat 20d by an interference fit.

In another alternative embodiment illustrated in FIG. 24, a slat 20e includes a magnet plate 64 that is mechanically interlocked with the slat by a series of extruded rails 67 extending from a supporting surface thereof that are deformed as the magnet plate is inserted in the slat. It would be apparent to one of ordinary skill in the art that a similar arrangement with rails could be utilized to support a linear motor secondary plate at the bottom portion of the slat as well or a plate only at the bottom portion of the slat.

In yet another alternative embodiment illustrated in FIG. 25, a slat 20f includes a concave rear wall 40 having an upper section 172, a lower section 174 and a middle section 176. Upper section 172 and lower section 174 are each formed with a planar surface 178 extending between ends 179 of the upper and lower surfaces, respectively. However, the surface defined by sections 172, 174 and 178 is a generally arcuate surface. Planar surfaces 174, 178 permit the deformation of rear wall 40', such as, for example, by peening, to thereby provide a mechanical interlock with the linear motor magnet plates 64, 64'.

With reference to FIGS. 27–34, a frame 148 of sortation conveyor 10 includes at least two elongated horizontal members 150a, 150b each defining fastener channels 151 along the respective horizontal members for attachment of items by fasteners 153 at selectable locations along the horizontal members. Such items may include diverter assemblies 16, linear motor primaries 28, and the like. Elongated members 150a, 150b may be extruded metal. Other items that may be attached to frame members 150a, 150b by fasteners include a plurality of vertically extending legs 152. Each leg 152 is formed having an attachment plate 154 positioned along interior surface 155 and proximate to top 156. Each attachment plate 154 has a plurality of through-holes 158. Each leg 152 is vertically adjustable by, for example, a base 157 formed with a plurality of vertically oriented and slightly slanted slots 157', which are placed in selective registration with through-holes 157" of leg 152.

Fasteners are used to secure base 157 to leg 152. Fastener channels 151 define a track assembly defined by an upper track 160 and a lower track 164 positioned a pre-selected distance apart. Fastener channels may also be present on exterior surface 161 of upper track 160 as provided with a plurality of longitudinal channels 162, while, similarly, exterior surface 165 of lower track 164 is provided with longitudinal channels 167. Positioned against exterior surface 161 and 166 of upper tracks 160 and lower tracks 164, respectively, are side plates 168. Side plates 168 include a plurality of upper through-holes 170, a plurality of middle through-holes 172, and a plurality of lower through-holes 174. Appropriate fasteners 153, such as, for example, bolts, are positioned through upper through-holes 170 of side plates 168 and are secured within a channel 162 of upper track 160. Analogously, appropriate fasteners are positioned through lower through-holes 174, and extend within channels 166 of lower track 164. Thus, side plates 170, when secured to the track assembly, maintain the proper distance between upper tracks 160 and lower tracks 164. Appropriate fasteners are also placed through attachment plates 154 of legs 152 and secured through middle through-holes 172 of side plates 168 to thereby secure legs 152 to upper track 160 and lower track 164.

To provide frame 150 with proper stability, one or more cross supports, or cross braces, 180 extend generally orthogonally between upper tracks 160 and lower tracks 164. Cross supports 180 are attached to tracks 160 and 164 by side plates 182 attached to ends of 181 of cross supports 180. As with side plates 168, side plates 182 are formed with upper through-holes 184, middle through-holes 186, and lower through-holes 188. Upper through-holes 184 are attached to upper tracks 160 along interior surface 163 by inserting fasteners through through-holes 184 and securing them within channels 162'. To secure cross supports 180 to lower tracks 164, fasteners are threaded through lower through-holes 188 and inserted within channels 166' formed along interior surface 167. Leg supports 190 are positioned between each pair of legs 152 and attached to legs 152 by the use of appropriate fasteners. Leg supports 190 are generally parallel to cross supports 180 and are positioned below support angles 176.

Linear motor primary supports 192 are attached to adjacent cross supports 180, and are generally orthogonal thereto. Linear motor primary supports 192 provide a support surface for the placement of linear motor primaries 28. One or more diverter assemblies are positioned between upper tracks 160 and lower tracks 164 by the use of appropriate fasteners inserted within the inner surfaces of upper and lower tracks 160, 164. Alternatively, diverting track assembly 165 may be attached to one or more cross supports 180.

Figure 28:
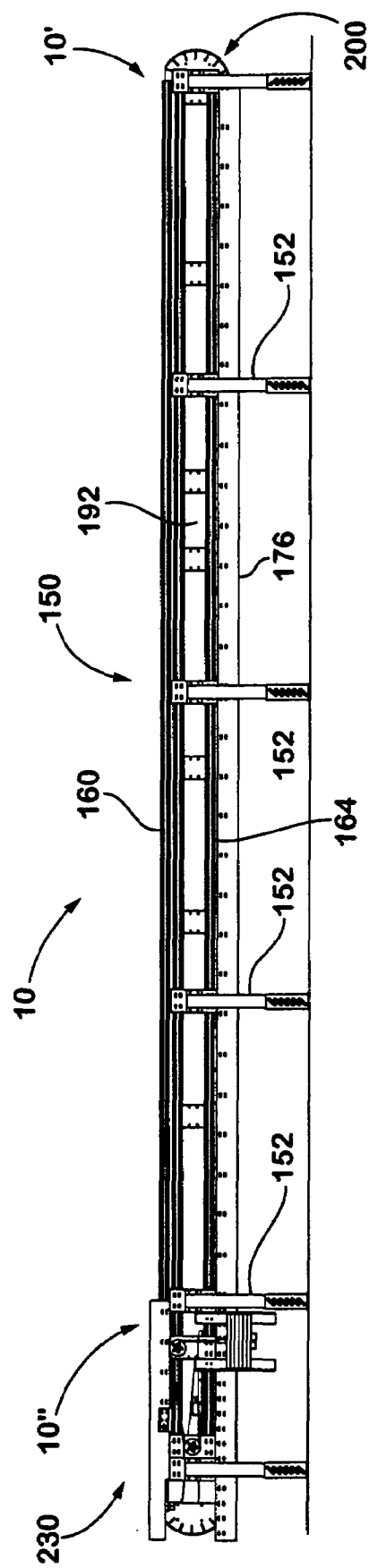
FIG. 28 is a side elevation of the frame assembly in FIG. 27.

As shown in FIGS. 28 and 29, end 10' of sortation conveyor 10 is fitted with a stationary end track assembly 200. Stationary end track assembly 200 includes a cross member 202 having a pair of ends 204, which are attached to mounting plates 206. Attached to mounting plates 206 are end tracks 208. Each mounting plate 206 is generally hexagonal in shape and includes a first section 210 formed with upper through-holes 212, middle through-holes 214, and lower through-holes 216. Second section 218 of mounting plates 206 is generally tapered in shape and includes a plurality of through-holes 220. Each end track 208 has an arcuate ledge 222, which serves as a riding surface for first wheels 112 of end members 24, and a center section 224 formed with a plurality of through-holes 226. To increase the stability of end tracks 208, a plurality of ribs 227 are provided between interior surface 223 of arcuate ledge 222, and center section 224.

To assemble stationary end track assembly 200, a plurality of L-shaped brackets 230 are secured to ends 204 of cross member 202 by the use of appropriate fasteners. L-shaped brackets 230 have a plurality of through-holes 231 placed in substantial registry with middle through-holes 214 of first section 210 of mounting plates 206 and channels 232 of cross member 202 through which fasteners are placed. Thereafter, end tracks 208 are positioned such that through-holes 226 are in registry with through-holes 220 of second section 218 of mounting plates 206 and appropriate fasteners placed there through. Once stationary end track assembly 200 is assembled, it is positioned between upper tracks 160 and lower tracks 164. Appropriate fasteners are then used to attach upper through-holes 212 and mounting plates 206 to interior surface 163 of upper track 160 and lower through-holes 216 to interior surface 165 of lower tracks 164. When in position on sortation conveyor 10, edges 209 of end tracks 208 are substantially aligned with upper edge 160' of upper track 160 and lower edge 164' of lower track 164 and thereby provides a smooth, continuous interface for movement of first wheels 112 of end members 24–24", as slats 20 are conveyed between the return run and upper run of sortation conveyor 10.

Figure 31:
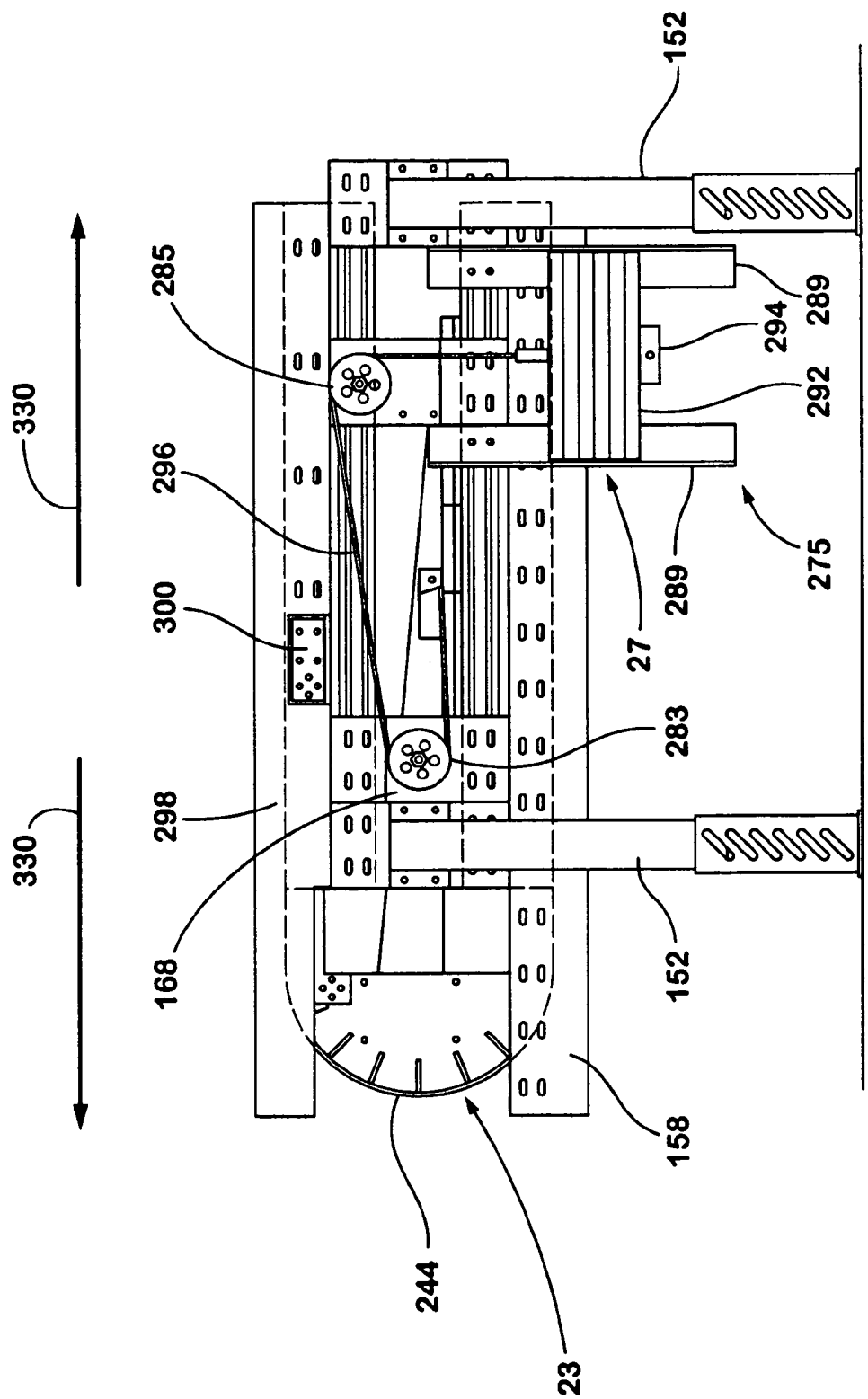
FIG. 31 is a side elevation of the take-up assembly in FIG. 30.
Figure 33B:
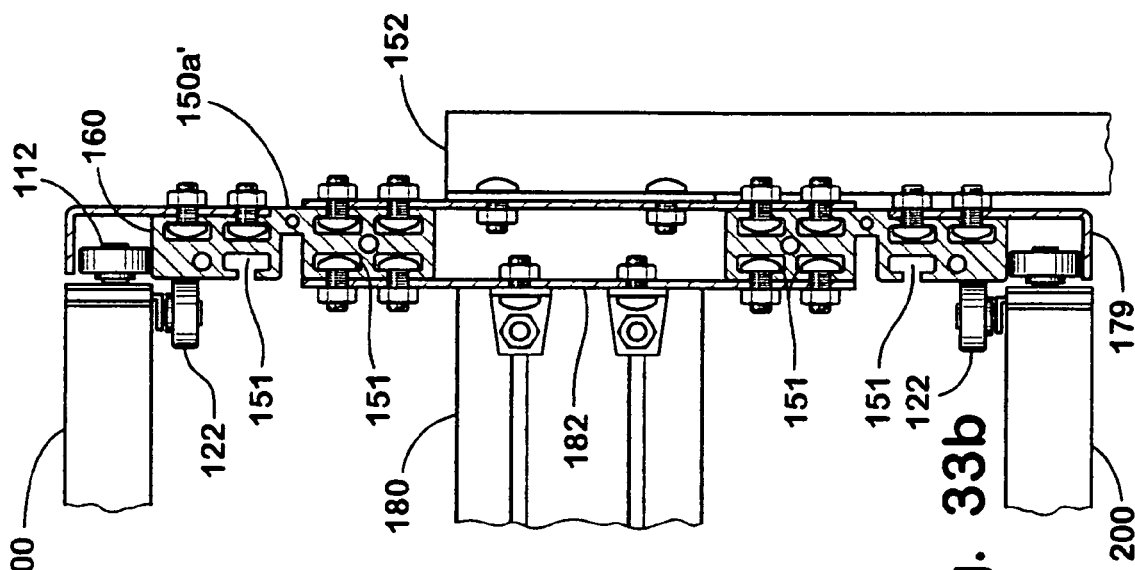
FIGS. 33a–33d are end elevations of the frame assembly in FIG. 27.
Figure 33A:
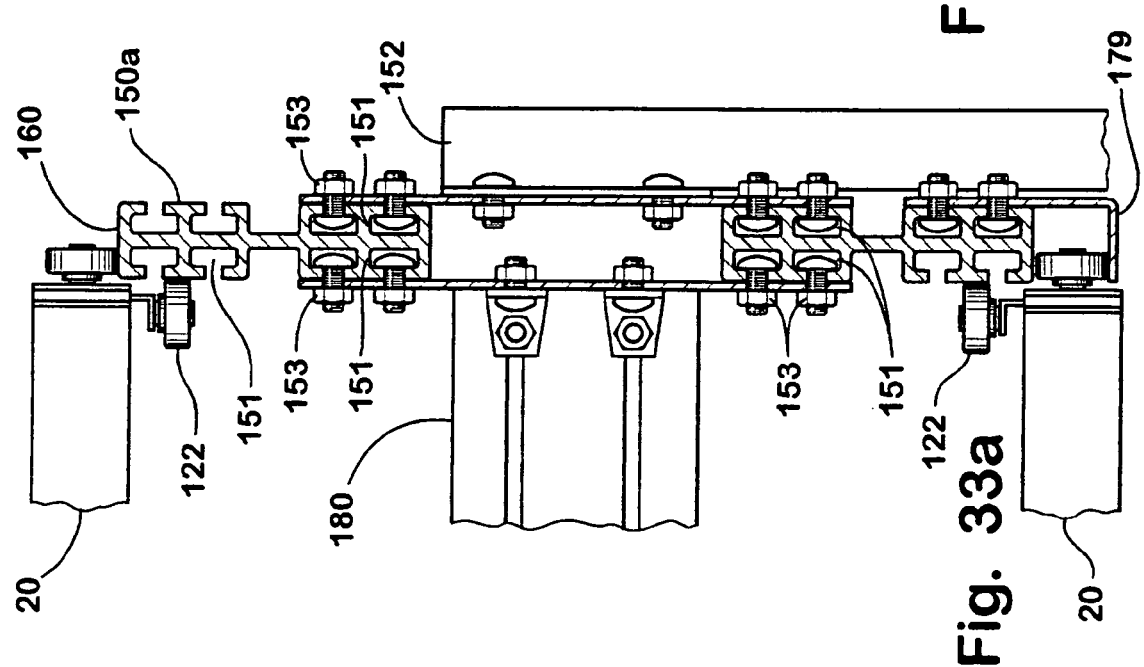
Figure 34:
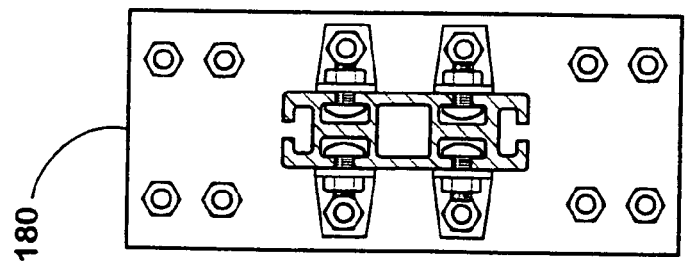
FIG. 34 is a side elevation of a cross support.
Figure 33C:
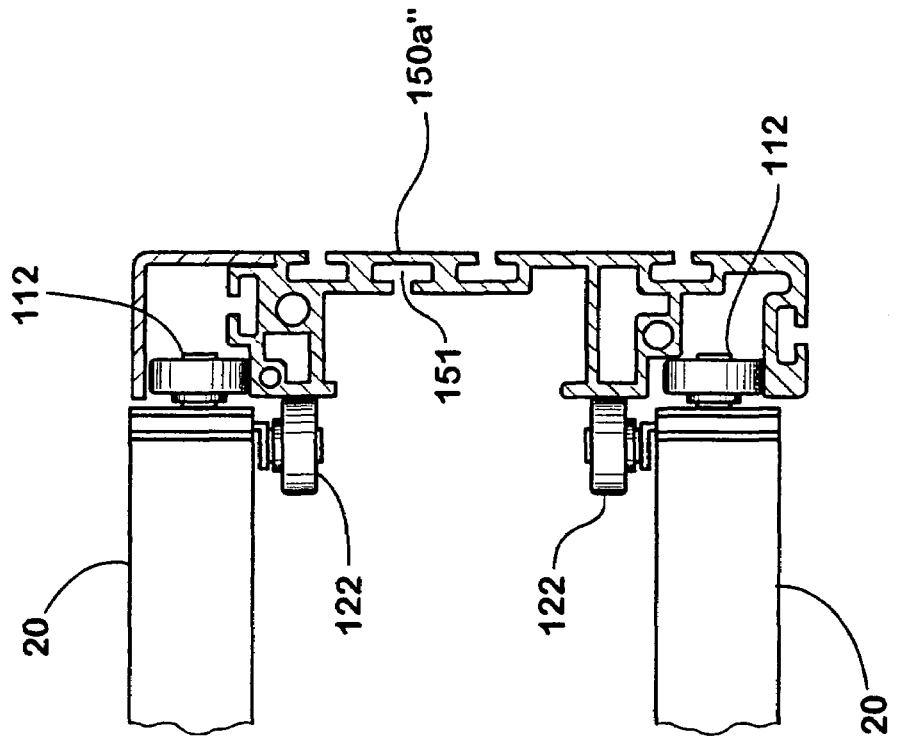
Figure 33D:
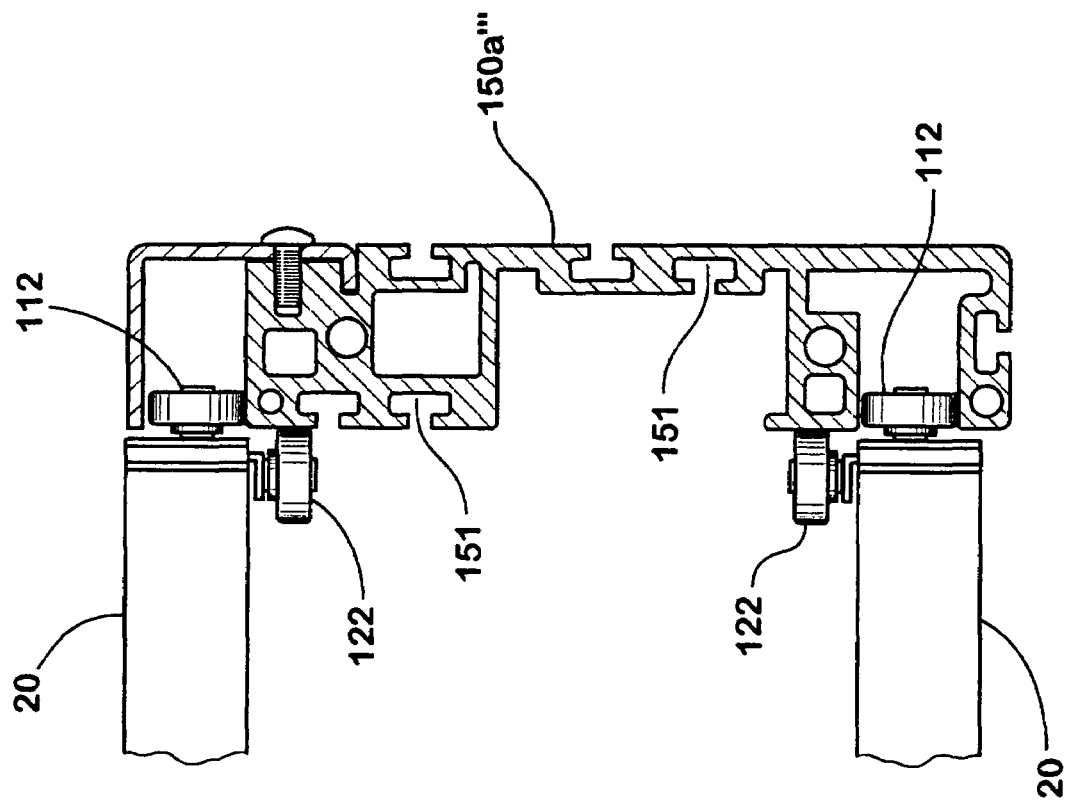

Turning now to FIGS. 30–32, opposite end 10" of frame 148 includes moveable member 23 and force-producing device 27 which define an adjustable take-up assembly 230. Take-up assembly 230 provides a substantially constant force upon slats 20 to thereby maintain the same in the proper state of tension, and takes up any slack existing between slats 20. Take-up assembly 230 is comprised of two identical sets of components, each of which is attached to a side 150' and 150" of frame 150. Therefore, the subsequent description will detail only one set of components, with the understanding that the identical components are placed on the opposing side of sortation conveyor 10 along end 10".

Take-up assembly 230 includes a guide member 232 having a pair of horizontally movable slide members 234. Guide member 234 is secured to a cross member 236 which is attached at its ends to lower tracks 164. A carriage 238 is attached to upper surfaces 235 of slide members 234 by using appropriate fasteners placed through through-holes 239. Carriage 238 includes an attachment bracket 240, and a cable bracket 242, both of which are attached to, and extend from, side 241 of carriage 238. An end track 244 includes an arcuate edge 245, a center section 246, a first or upper flange 247 extending from the upper region of center section 246 and a second or lower flange 248 extending from the lower region of center section 246. Upper flange 247 is generally planar while lower flange 248 is generally L-shaped with a horizontal section 248' preferably integrally attached to arcuate edge 245. Attachment bracket 240 of carriage 238 is secured to end track 244 by the use of fasteners placed through through-holes 240' of attachment bracket 240 and through-holes 244' of end track 214.

An expansion joint assembly 25 is provided to enable end track 244 to move in a horizontal direction either towards or away from upper track 160 and lower track 164 while maintaining continuity of the track. Joint assembly 25 includes a finger joint 254 and a mounting plate 256. As shown in FIG. 32, first finger joint 252 includes a mounting section 258 having a plurality of through-holes 259 which are placed in registration with through-holes 260 formed in end track 244, and secured thereto by appropriate fasteners. When in position, first finger joint 252 is positioned on interior surface 244' of end track 244 with upper flange 247 being substantially co-planar with fingers 261 of first finger joint 252. Second finger joint 254 has a plurality of fingers 262 and a mounting section 264. Upper track 160 is formed with a cutout section 266 into which second finger joint 254 is positioned. Once in position, second finger joint 254 is aligned with upper track 160 such that fingers 262 are generally co-planar with top edge 160' of upper track 160, while mounting section 264 is positioned beyond external surface 161 of upper track 160 and secured thereto by fasteners extending through through-holes 264'. Mounting plate 256 is positioned along inner surface 163 of upper track 160 and beyond surface 255 of second finger joint 254. A cross member 268 extends orthogonally between upper track assemblies 160, with each end including two top attachment brackets 270 and two side attachment brackets 272. Top attachment brackets 270 each have a horizontal section 270' and a vertical section 270", both of which are equipped with a through-hole 271. Side attachment brackets 272 are also equipped with a pair of through-holes 273. Side attachment brackets 272 attach cross member 168 to upper track assembly 160 by the insertion of appropriate fasteners through through-holes 273 and channels 269 of cross member 268, and channels 162' of upper track 160. Vertical section 270" of top attachment brackets 170 is placed in registration with mounting plate 256. Specifically, mounting plate 256 is positioned so that through-hole 256' is placed in registry with a through-hole 264' of mounting section 264 of second finger joint 254 to allow passage of a fastener there through, while the other top attachment bracket 270 is placed in registration with through-hole 256" of mounting plate 256. An appropriate fastener is placed there through and extends within channel 162' formed in interior surface 163 of upper track 160.

To provide the necessary force upon end tracks 244 of take-up assembly 230, force-producing device 27 in the form of an adjustable force assembly 275 is provided which imparts a constant force upon end tracks 244 to thereby maintain the same in the proper position and thereby take up slack within slats 20. Adjustable force assembly 275 may include an adjustable weight system 277, and a pulley system 279. Pulley system 279 includes a first pulley 281 attached to a first pulley support 283, and a second pulley 285 attached to a second pulley support 287. First pulley support 283 is attached to exterior surface 165 of lower track assembly 164 and includes a plurality of through-holes 284 through which fasteners are inserted therein to secure the same to lower track 164. Similarly, second pulley support 285 includes through-holes 286, enabling the same to be attached to middle through-holes 172 of side plate 168.

Weight assembly 277 includes a pair of spaced, vertically oriented L-shaped alignment members 289 which may be adjustable by adding or subtracting weight. Alignment members 289 are spaced from the exterior surface 165 of lower track 164 by spacers 290, and attached there through by appropriate fasteners placed through through-holes 291. Positioned between alignment members 289 are a plurality of removable weights 292, each of which includes a keyhole-shaped slot 293 dimensioned to receive a weight-retaining member 294.

A drive member, such as, for example, a cable 296, is attached to weight-retaining member 294 and trained about first pulley 281 and second pulley 285. Cable 296 is attached at its opposing end to cable bracket 242 of carriage 238, which extends between upper track 160 and lower track 164. A generally L-shaped upper support member 298 is attached to upper track 160 and projects there above. Attachment of upper support member 298 is achieved by the placement of fasteners through through-holes 299 and secured within upper track 160. Upper support member 298 is formed with a cutout section 300 dimensioned to permit mounting section 264 of second finger joint 254 to be attached to upper track 160.

Frame end 200 has a shape that is substantially circular, namely, a portion of a circle. Alternative frame ends 200' and 200" have shapes that are non-circular. Frame end 200' has a non-circular shape that is symmetrical about a horizontal axis H. An example is a parabola. Frame end 200" has a non-circular shape that is not symmetrical about a horizontal axis H. The shape has a lower curvature at an upper portion and a higher curvature at a lower portion, although the lower curvature could be at the bottom portion and the higher curvature at the lower portion. The purpose of such non-circular curve is to reduce noise by controlling acceleration of the web at one or both transition portions. Such a non-circular shaped frame end at one end of the frame could be combined with a circular-shaped frame end at the opposite end of the frame or another non-circular shaped frame end at the opposite end of the frame.

As can be seen, the present invention provides a positive displacement sortation system and method that has many advantages over prior systems. Moreover, the various aspects of the invention may be utilized separately or in combination. For example, the unique shoe and slat configuration may be utilized with a conventional rotary motor and chain drive or may be utilized with other linear motor propulsion systems, such as the type disclosed in commonly assigned U.S. Pat. No. 5,588,520, the disclosure of which is hereby incorporated herein by reference. Likewise, the unique linear motor propulsion system disclosed herein may be utilized with other sorter configurations including other positive displacement shoe and slat sorters as well as other sorter configurations, such as tilt-tray sorters, cross-belt sorters, and the like. The various unique aspects of the frame may be used individually and with other types of positive displacement shoe and slat sorters.

Changes and modifications in the specifically described embodiments can be carried out without departing from the principles of the invention which is intended to be limited only by the scope of the appended claims, as interpreted according to the principles of patent law including the doctrine of equivalents.

The invention claimed is:

1. A positive displacement sorter apparatus for sorting articles to a plurality of spurs, comprising:
   a plurality of interconnected slats defining an endless web having upper and lower runs, said upper run of said web defining a conveying surface;
   a plurality of pusher shoes, each traveling along at least one of said slats to laterally displace articles on said conveying surface;
   a plurality of diverter assemblies, each of said diverter assemblies for laterally propelling a plurality of said pusher shoes laterally of said conveying surface toward one of the spurs in order to divert an article to that spur, each of said diverter assemblies comprising at least two generally parallel guide rails extending diagonally under said upper run of said web and at least two actuators, each for actuating pusher shoes toward the one of said guide rails associated with that actuator;
   a linear motor propulsion system for propelling said endless web, said linear motor propulsion system comprising a plurality of primaries and a plurality of secondaries, said plurality of secondaries joined with said slats;
   a control, said control controlling said linear motor propulsion system for propelling said endless web at a controlled speed, said control controlling said diverter assemblies for diverting articles to selected spurs, said control operating at least one of said actuators to cause said at least one of said actuators to actuate at least one of said pusher shoes toward the associated one of said guide rails to divert an article to the associated spur.

2. The sorter apparatus of claim 1 wherein each of said slats has an upper surface portion that is generally planar.

3. The sorter apparatus of claim 1 wherein said actuators comprise electromagnetic actuators that magnetically attract the pusher shoes.

4. The sorter apparatus of claim 3 wherein each of said pusher shoes includes an elongated transfer assembly below said conveying surface for engaging one of said guide rails, said actuators magnetically attracting said transfer assembly.

5. The sorter apparatus of claim 3 wherein each of said pusher shoes includes a bearing below said conveying surface for engaging one of said guide rails, said actuator magnetically attracting said bearing.

6. The sorter apparatus of claim 1 wherein said control operates a state machine for controlling said linear motor propulsion system, said state machine operating in one of a plurality of states.

7. The sorter apparatus of claim 6 wherein said plurality of states comprise at least an acceleration state during which said linear motor propulsion system is accelerating said web, an idling state during which no adjustment is being made to the speed of said web, and a deceleration state during which said linear motor propulsion system is decelerating said web.

8. The sorter apparatus of claim 1 wherein each of said diverter assemblies comprising at least three generally parallel guide rails extending diagonally under said upper run of said web and at least three actuators, each for actuating pusher shoes toward the one of said guide rails associated with that actuator.

9. A positive displacement sorter apparatus for sorting articles to a plurality of spurs, comprising:
   a plurality of interconnected slats defining an endless web having upper and lower runs, said upper run of said web defining a conveying surface;
   a plurality of pusher shoes, each traveling along at least one of said slats to laterally displace articles on said conveying surface;
   a plurality of diverter assemblies, each of said diverter assemblies for laterally propelling a plurality of said pusher shoes laterally of said conveying surface toward one of the spurs in order to divert an article to that spur, each of said diverter assemblies comprising at least two generally parallel guide rails extending diagonally under said upper run of said web and at least two actuators, each for actuating pusher shoes toward the one of said guide rails associated with that actuator;
   a linear motor propulsion system for propelling said endless web, said linear motor propulsion system comprising a plurality of primaries and a plurality of secondaries, said plurality of secondaries joined with said slats;
   a control, said control controlling said linear motor propulsion system for propelling said endless web at a controlled speed, said control controlling said diverter assemblies for diverting articles to selected spurs, said control measuring lengths of articles, said control operating said at least two actuators to cause each of said at least two actuators to actuate one of said pusher shoes toward the associated one of said guide rails to divert an article having a length below a particular length, said control operating no more than one of said at least two actuators to actuate a plurality of said pusher shoes toward the associated one of said guide rails to divert an article having a length greater than said particular length.

10. The sorter apparatus of claim 9 wherein each of said slats has an upper surface portion that is generally planar.

11. The sorter apparatus of claim 9 wherein said actuators comprise electromagnetic actuators that magnetically attract the pusher shoes.

12. The sorter apparatus of claim 11 wherein each of said pusher shoes includes an elongated transfer assembly below said conveying surface for engaging one of said guide rails, said actuators magnetically attracting said transfer assembly.

13. The sorter apparatus of claim 11 wherein each of said pusher shoes includes a bearing below said conveying surface for engaging one of said guide rails, said actuator magnetically attracting said bearing.

14. The sorter apparatus of claim 9 wherein said control operates a state machine for controlling said linear motor propulsion system, said state machine operating in one of a plurality of states.

15. The sorter apparatus of claim 14 wherein said plurality of states comprise at least an acceleration state during which said linear motor propulsion system is accelerating said web, an idling state during which no adjustment is being made to the speed of said web, and a deceleration state during which said linear motor propulsion system is decelerating said web.

16. The sorter apparatus of claim 9 wherein each of said diverter assemblies comprising at least three generally parallel guide rails extending diagonally under said upper run of said web and at least three actuators, each for actuating pusher shoes toward the one of said guide rails associated with that actuator.

17. A positive displacement sorter apparatus for sorting articles to a plurality of spurs, comprising:
   a plurality of interconnected slats defining an endless web having upper and lower runs, said upper run of said web defining a conveying surface;

a plurality of pusher shoes, each traveling along at least one of said slats to laterally displace articles on said conveying surface;

a plurality of diverter assemblies, each of said diverter assemblies for laterally propelling a plurality of said pusher shoes laterally of said conveying surface toward one of the spurs in order to divert an article to that spur, each of said diverter assemblies comprising at least two generally parallel guide rails extending diagonally under said upper run of said web and at least two actuators, each for actuating pusher shoes toward the one of said guide rails associated with that actuator;

a linear motor propulsion system for propelling said endless web, said linear motor propulsion system comprising a plurality of primaries and a plurality of secondaries, said plurality of secondaries joined with said slats;

a control, said control controlling said linear motor propulsion system for propelling said endless web at a controlled speed, said control controlling said diverter assemblies for diverting articles to selected spurs, said control operating at least one of said actuators to cause said at least one of said actuators to actuate at least one of said pusher shoes toward the associated one of said guide rails to divert an article to the associated spur; and each of said pusher shoes comprising a body molded from a plastic material and a plurality of lubricating strips, each of said lubricating strips at an interface between that pusher shoe and the associated one of said slats, wherein said plastic material comprises a durable plastic material.

18. The sorter apparatus of claim 17 wherein each of said slats has an upper surface portion that is generally planar.

19. The sorter apparatus of claim 17 wherein said actuators comprise electromagnetic actuators that magnetically attract the pusher shoes.

20. The sorter apparatus of claim 19 wherein each of said pusher shoes includes an elongated transfer assembly below said conveying surface for engaging one of said guide rails, said actuators magnetically attracting said transfer assembly.

21. The sorter apparatus of claim 19 wherein each of said pusher shoes includes a bearing below said conveying surface for engaging one of said guide rails, said actuator magnetically attracting said bearing.

22. The sorter apparatus of claim 17 wherein said control operates a state machine for controlling said linear motor propulsion system, said state machine operating in one of a plurality of states.

23. The sorter apparatus of claim 22 wherein said plurality of states comprise at least an acceleration state during which said linear motor propulsion system is accelerating said web, an idling state during which no adjustment is being made to the speed of said web, and a deceleration state during which said linear motor propulsion system is decelerating said web.

24. The sorter apparatus of claim 17 wherein each of said diverter assemblies comprising at least three generally parallel guide rails extending diagonally under said upper run of said web and at least three actuators, each for actuating pusher shoes toward the one of said guide rails associated with that actuator.

* * * * *